United States Patent [19]

Horii

[11] Patent Number: 5,673,375

[45] Date of Patent: Sep. 30, 1997

[54] METHOD FOR THREE-DIMENSIONALLY DRAWING FIGURE ON DISPLAY PLANE

[75] Inventor: Youichi Horii, Hachioji, Japan

[73] Assignee: Hitachi, Ltd., Tokyo, Japan

[21] Appl. No.: 306,153

[22] Filed: Sep. 14, 1994

[30] Foreign Application Priority Data

Sep. 20, 1993 [JP] Japan .................. 5-232821

[51] Int. Cl.[6] .................................................. G06T 15/50
[52] U.S. Cl. .................................................. 395/126
[58] Field of Search .............................. 395/119, 121, 395/122, 126, 127

[56] References Cited

U.S. PATENT DOCUMENTS

| 4,901,064 | 2/1990 | Deering | 395/126 |
| 5,083,287 | 1/1992 | Obata et al. | 395/126 |
| 5,278,949 | 1/1994 | Thayer | 395/119 |
| 5,317,678 | 5/1994 | Okawara et al. | 395/126 |
| 5,463,723 | 10/1995 | Saha | 395/126 X |
| 5,485,556 | 1/1996 | Takagi et al. | 395/126 |

FOREIGN PATENT DOCUMENTS 5-233780  9/1993  Japan .

OTHER PUBLICATIONS

"Macdraw-II," Claris Co., Ltd., Section 2, pp. 22–37.
"Nikkei Computer Graphics," Jul. 1992, pp. 91–103.

*Primary Examiner*—Joseph H. Feild
*Assistant Examiner*—Cliff N. Vo
*Attorney, Agent, or Firm*—Fay, Sharpe, Beall, Fagan, Minnich & McKee

[57] ABSTRACT

With employment of a pointing device equipped with at least one switch, and connected to a computer, both of a drawing position of a figure to be drawn on a display plane, and a size of this figure are designated. Another designation is made of a height of a predetermined region within the figure to be drawn, measured from edge portions of this figure to be drawn, along the vertical direction with respect to this display plane by employing the above-described pointing device. A further designation is made of a direction of light illuminated to the figure to be drawn by using the above-mentioned pointing device. Based upon the designated height and light direction, brightness of each of regions subdivided from this figure to be drawn is calculated, and each of the subdivided regions is displayed at the calculated brightness, so that this figure is three-dimensionally displayed on the display plane.

22 Claims, 14 Drawing Sheets

FIG.12A

750 THICKNESS COUNTER TABLE i : HORIZONTAL DIRECTION →

Z(i,j)

j : VERTICAL DIRECTION ↓

| 0 | 0 | 0 | 0 | 0 | 0 | 0 | 0 | 0 | 0 |
|---|---|---|---|---|---|---|---|---|---|
| 0 | 0 | 1 | 1 | 0 | 0 | 0 | 0 | 0 | 0 |
| 0 | 1 | 1 | 4 | 1 | 1 | 0 | 0 | 0 | 0 |
| 0 | 1 | 2 | 3 | 1 | 0 | 0 | 0 | 0 | 0 |
| 0 | 1 | 2 | 1 | 0 | 0 | 0 | 1 | 0 | 0 |
| 0 | 1 | 1 | 0 | 0 | 0 | 1 | 2 | 1 | 0 |
| 0 | 0 | 0 | 0 | 0 | 0 | 0 | 1 | 0 | 0 |
| 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 0 |
| 0 | 1 | 2 | 2 | 2 | 2 | 2 | 2 | 2 | 2 | 2 | 2 | 2 | 1 | 0 |
| 0 | 1 | 2 | 3 | 3 | 3 | 3 | 3 | 3 | 3 | 3 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 4 | 4 | 4 | 4 | 4 | 4 | 4 | 3 | 2 | 1 | 0 |
| 0 | 1 | 2 | 3 | 3 | 3 | 3 | 3 | 3 | 3 | 3 | 3 | 2 | 1 | 0 |
| 0 | 1 | 2 | 2 | 2 | 2 | 2 | 2 | 2 | 2 | 2 | 2 | 2 | 1 | 0 |
| 0 | 1 | 1 | 1 | 1 | 1 | 1 | 1 | 1 | 1 | 1 | 1 | 1 | 1 | 0 |
| 0 | 0 | 0 | 0 | 0 | 0 | 0 | 0 | 0 | 0 | 0 | 0 | 0 | 0 | 0 |

METHOD FOR THREE-DIMENSIONALLY DRAWING FIGURE ON DISPLAY PLANE

BACKGROUND OF THE INVENTION

The present invention relates to a method for drawing a figure on a display plane by employing a computer, and more specifically, to a method for three-dimensionally drawing the figure on the display plane.

With reference to FIG. 1A to FIG. 1D, a description will now be made of the conventional method for drawing the figure on the display plane by employing the computer. FIG. 1A schematically shows the conventional two-dimensional figure drawing method, FIG. 1B schematically represents the conventional figure drawing method with employment of the trihedral plane, and FIG. 1C schematically denotes the conventional figure drawing method with employment of the mesh.

As apparent from the manual on "Macdraw-II (CLARIS Co., Ltd.)" section 2, pages 22 to 37, the conventional two-dimensional figure drawing method is realized as follows: That is, for instance, as shown in FIG. 1A, this conventional figure drawing method is such that the previously designated FIG. 903 is drawn on the front plane of the previously entered FIG. 902 by designating the display position and size of this FIG. 903 with employment of the pointing device (namely, FIG. 903 is overwritten on FIG. 902). The figures handled by this conventional figure drawing method are such two-dimensional figures as the line segment (901), rectangle (902) and ellipse (903), but these two-dimensional figures could not be directly represented with having back feeling along the vertical direction with respect to the planes thereof. In case that a button or the like is three-dimensionally drawn by combining these conventional methods, for example, as shown in FIG. 1D, the following process stages are required. That is, the polygons such as 920 and 921 are painted over with light colors, the polygons such as 922 and 923 are painted over with dark colors, and further the polygon such as 924 is painted over with an intermediate color.

Also, as apparent from Japanese magazine "NIKKEI COMPUTER GRAPHICS" issued in July 1992, pages 91 to 103, the three-dimensionally displaying method with using the three-dimensional figures has been proposed. In this case, three-directional data about the respective points of the figure, namely the horizontal direction, vertical direction, and depth direction are set based on the trihedral drawing as represented by, for example, a side view 911, a plan view 912, and a front view 913 of FIG. 1B, which are intersected with each other at a right angle from three directions. Then, the three-directional data are projected onto the two-dimensional plane, thereby obtaining the three-dimensional FIG. 914.

Also, as seen from JP-A-5-233780, such a method has been proposed that delicate surface shapes are three-dimensionally represented. In this case, for instance, as indicated in FIG. 1C, grid-shaped mesh is made on the figure surface, and the grid points are selected by a pointing device such as a mouse, and then the pointing device is transported along the horizontal direction, the vertical direction, or the depth direction, so that the figure could be three-dimensionally drawn.

SUMMARY OF THE INVENTION

Since no care has been taken for the thickness (height) direction of the respective figure (namely, direction perpendicular to display plane) in the above-described conventional two-dimensional figure drawing method, the figure with a feeling of a material such as actual paintings could not be represented.

In the conventional figure drawing method by trihedral planes, it is required to enter the data from three directions with respect to a single figure, so that such a data entry cannot be intuitively performed, and also such a cumbersome input operation is required.

Further, in the conventional figure drawing method by applying the mesh to the figure to be drawn, it is required to select the transporting direction of the grid point with respect to the respective grid points and the grid point to be transported, and to input the transport of the grid point, resulting in cumbersome input operations.

Further, when a wiring pattern is outputted on output paper, or represented on a display of a computer during an IC designing operation, only two-dimensional information such as width/length of the wiring pattern could be represented. As a consequence, in case that a wiring pattern owns a multilayer structure, as represented in FIG. 1E, the wiring patterns of the respective layers are represented in such a manner that these wiring patterns can be discriminated by different colors. However, when the display of the computer owns insufficient functions capable of simultaneously displaying different colors, and/or the printer thereof owns insufficient color resolution, there is a limitation in the number of layers which are discriminatable from the wiring pattern representation. Even when the display of the computer owns sufficient functions capable of simultaneously displaying different colors, and/or the printer thereof owns sufficient color resolution, there is a limitation in color resolution by a person who tries to perform visual investigation, or there is a difference in this color resolution by a person. Accordingly, it is not preferable to represent the respective layers of the multilayer wiring patterns in different colors.

An object of the present invention is to solve the above-explained conventional drawbacks, and therefore, is to provide a method capable of three-dimensionally displaying a figure on a display plane with ease.

Another object of the present invention is to provide a figure drawing method capable of readily representing a thickness of a figure along a vertical direction with respect to a display plane, such as an actual oil painting.

A further object of the present invention is to provide a figure drawing method capable of easily representing thicknesses of plural figures along a vertical direction with respect to a display plane while these figures are drawn in an overwriting mode on the display plane.

A still further object of the present invention is to provide a figure drawing method capable of representing a plurality of figures overwritten on a display plane, which are readily discriminatable from each other. In particular, when wiring patterns of an integrated circuit are drawn in a multilayer condition on a display plane, the respective layers can be easily recognized.

According to an aspect of the present invention, a figure drawing method for three-dimensionally displaying a figure on a display plane, includes the steps of:

a). designating a size and a drawing position of a figure to be drawn on the display plane by employing a pointing device equipped with at least one switch and connected to a computer;

b). designating a height of a predetermined region of the figure to be drawn, measured from an edge portion of the figure to be drawn along a vertical direction with respect to the display plane by employing the pointing device;

c). designating a direction of light illuminated to the figure to be drawn by employing said pointing device;

d). calculating brightness of each of regions subdivided from the figure to be drawn based on both of the designated height and the light direction; and e). displaying each of the subdivided regions at the calculated brightness, whereby the figure is three-dimensionally represented.

In accordance with such an aspect of the present invention, brightness of the respective subdivided regions of the figure to be drawn can be obtained by designating the drawing position and size of this figure the height of a predetermined region, and further the direction of light illuminated to this figure. As a result, the respective subdivided regions of this figure are represented in the brightness corresponding to the angles with respect to the light illuminated thereto, so that the above-described predetermined region seems to be floated (or sunk), and the figure can be three-dimensionally represented.

According to an example of the present invention, the step d) includes a substep for calculating a normal vector perpendicular to the respective planes of the subdivided regions; a substep for calculating an angle between the calculated normal vector and a vector of the light direction; and a substep for calculating brightness of the region based upon the calculated angle.

According to an example of the present invention, the substep for calculating the normal vector is to calculate three-dimensional coordinate values in each of the subdivided regions based on the drawing position, size and height, which are designated at the steps a) and b), and also it to calculate a normal vector of the subdivided region based on the calculated three-dimensional coordinate values.

According to an example of the present invention, the figure drawing method further includes the step of:

designating a color of the figure to be drawn with employment of the pointing device, wherein the step e) is to display each of the subdivided regions with the designated color at the calculated brightness.

According to an example of the present invention, the substep for calculating the normal vector is to calculate three-dimensional coordinate values in each of the subdivided regions, assuming that all of the predetermined regions own the designated heights measured from the edge portion, and regions other than the predetermined regions of the figure to be drawn are inclined from the edge portion toward the predetermined regions.

According to an example of the present invention, the figure drawing method further includes the step of:

drawing another figure by executing the preceding steps a) to e), whereby a portion of the previously drawn figure, which is overlapped with the another figure is erased.

According to an example of the present invention, the figure drawing method further comprises the step of:

drawing another figure by executing the preceding steps a) to e), whereby a height of a portion of the another figure, which is overlapped with the previously drawn figure, is equal to a summation between a height of the another figure and a height of the previously drawn figure.

As a result, when the figures are overwritten with each other, these figures may be three-dimensionally represented in such a manner that the succeedingly drawn figure is overwritten on the display plane of the previously drawn figure, as in an oil painting.

According to another aspect of the present invention, a method for three-dimensionally displaying a figure on a display plane, includes the steps of:

a). designating a size and a drawing position of a figure to be drawn on the display plane by employing a pointing device equipped with at least one switch and connected to a computer;

b). designating a height of a predetermined region of the figure to be drawn, measured from an edge portion of the figure to be drawn along a vertical direction with respect to the display plane by employing the pointing device;

c). designating a direction of light illuminated to the figure to be drawn by employing the pointing device;

d). calculating three-dimensional coordinate values of each of pixels of the figure to be drawn on the display plane and a vertical direction based upon the designated drawing position, size and height;

e). calculating brightness of each of the subdivided regions of the figure to be drawn based upon the calculated coordinate values and the light direction; and f). displaying each of the subdivided regions at the calculated brightness, whereby the figure is three-dimensionally represented.

As described above, there are provided the counters for counting the heights of the respective pixels, corresponding to these pixels of the display plane. Accordingly, when another figure is drawn on the previously drawn figure, the counted values of the respective counters may be added, or subtracted in accordance with the height of the respective pixels of another figure. Thus, the counted values of the respective counters represent the accumulated heights of the respective pixels of another figure. As a consequence, the respective regions are displayed based on the accumulated values of these counters, so that these figures can be three-dimensionally represented as an oil painting in such a manner that the succeedingly drawn figure is overwritten on the precedingly drawn figure.

According to an example of the present invention, each of the subdivided regions is a polygon for connecting at least three pixels in the figure to be drawn.

According to still another aspect of the present invention, a method for three-dimensional displaying a figure on a display plane, includes the steps of:

a). designating a size and a drawing position of a figure to be drawn on the display plane by employing a pointing device equipped with at least one switch and connected to a computer;

b). designating a height of a predetermined region of the figure to be drawn, measured from an edge portion of the figure to be drawn along a vertical directional with respect to the display plane by employing the pointing device;

c). designating a direction of light illuminated to the figure to be drawn by employing the pointing device;

d). calculating two-dimensional coordinate values of pixels of the figure to be drawn on the display plane based on the designated drawing position and the designated size;

e). counting the coordinate values of the pixels of the figure to be drawn along the vertical direction with respect to the display plane based upon the designated height;

f). calculating brightness of each of the subdivided regions of the figure to be drawn based on the coordinate values and the light direction calculated at the preceding steps d) and e); and g). displaying each of the subdivided regions at the calculated brightness, whereby the figure is three-dimensionally represented.

In accordance with the last-mentioned aspect of the present invention, the brightness of the respective regions of each of links for the wiring pattern to be drawn may be calculated by designating the height of a predetermined region of this wiring pattern and the direction of light illuminated to this wiring pattern by way of the pointing device. As a consequence, the respective regions of this link are represented at the brightness corresponding to the angle with respect to the illuminated light, so that the above-described predetermined region seems to be floated (or sunk), and therefore the wiring patterns can be three-dimensionally displayed. As a consequence, when a multi-layer of wiring patterns is displayed in the overwriting mode (overlapping mode), the wiring patterns provided at the respective layers are three-dimensionally displayed, and furthermore in the overlapped portions of the upper layer and the lower layer, the lower layer is erased, whereby the respective layers of wiring patterns can be readily recognized.

As previously described in detail, in accordance with the present invention, in the method for entering a figure into a display by employing a computer, the heights (thicknesses) of the respective regions of this figure are increased in correspondence with the entry number of overlapped figures. The brightness of the respective regions is determined based on the heights of these regions and the light source direction so as to draw the figure. As a consequence, the figure with material feeling can be displayed as an actual picture in accordance with the same sequence as the conventional plane figure inputting operation.

BRIEF DESCRIPTION OF THE DRAWINGS

FIG. 12A schematically indicates one example of a thickness (height) counter table employed in the embodiment of FIG. 10;

FIG. 12B schematically represents one example of a thickness counter table in case that the figure of FIG. 10 is drawn;

DESCRIPTION OF THE PREFERRED EMBODIMENTS

Referring now to the accompanying drawings, a figure drawing method according to various embodiments of the present invention will be described.

Figure 1A:
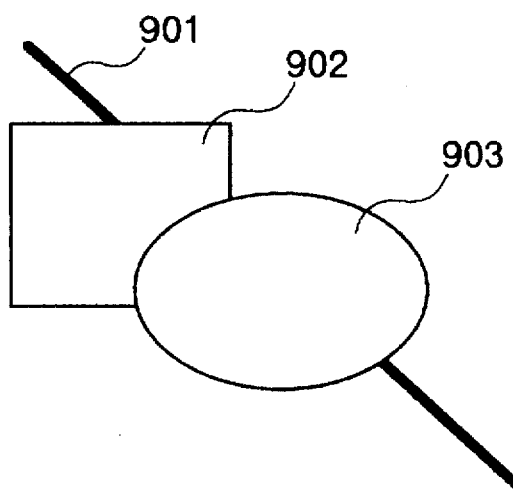
FIGS. 1A to 1E are explanatory diagrams for illustrating the conventional figure drawing methods.
Figure 1C:
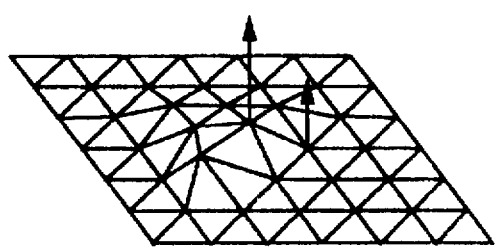
Figure 1B:
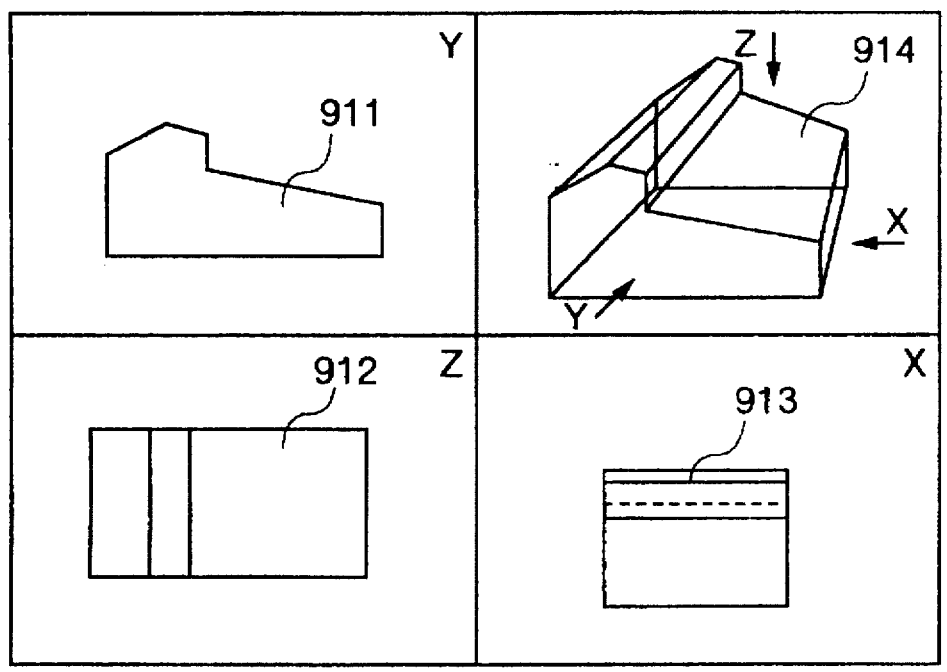
Figure 1D:
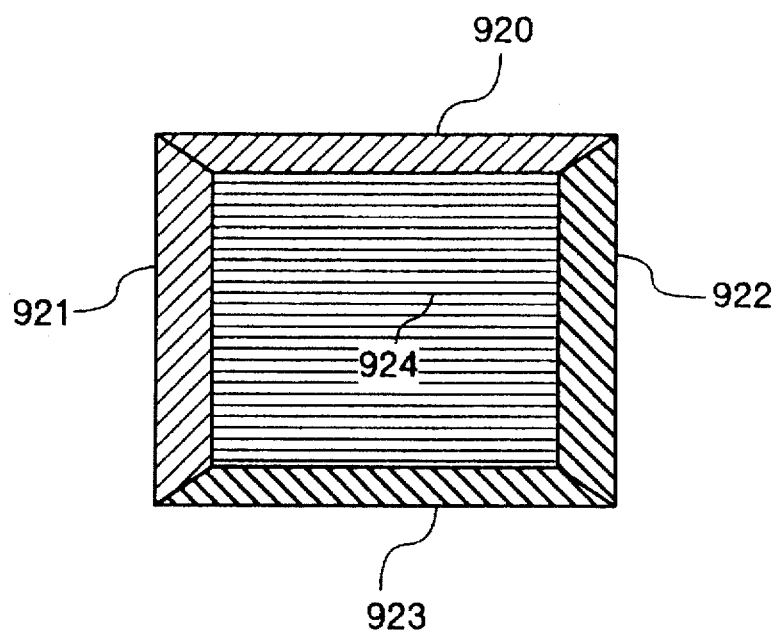
Figure 1E:
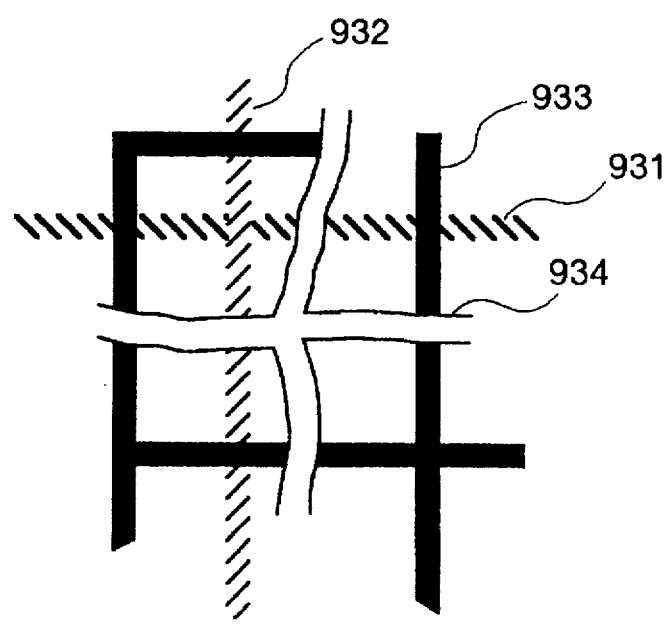
Figure 2:
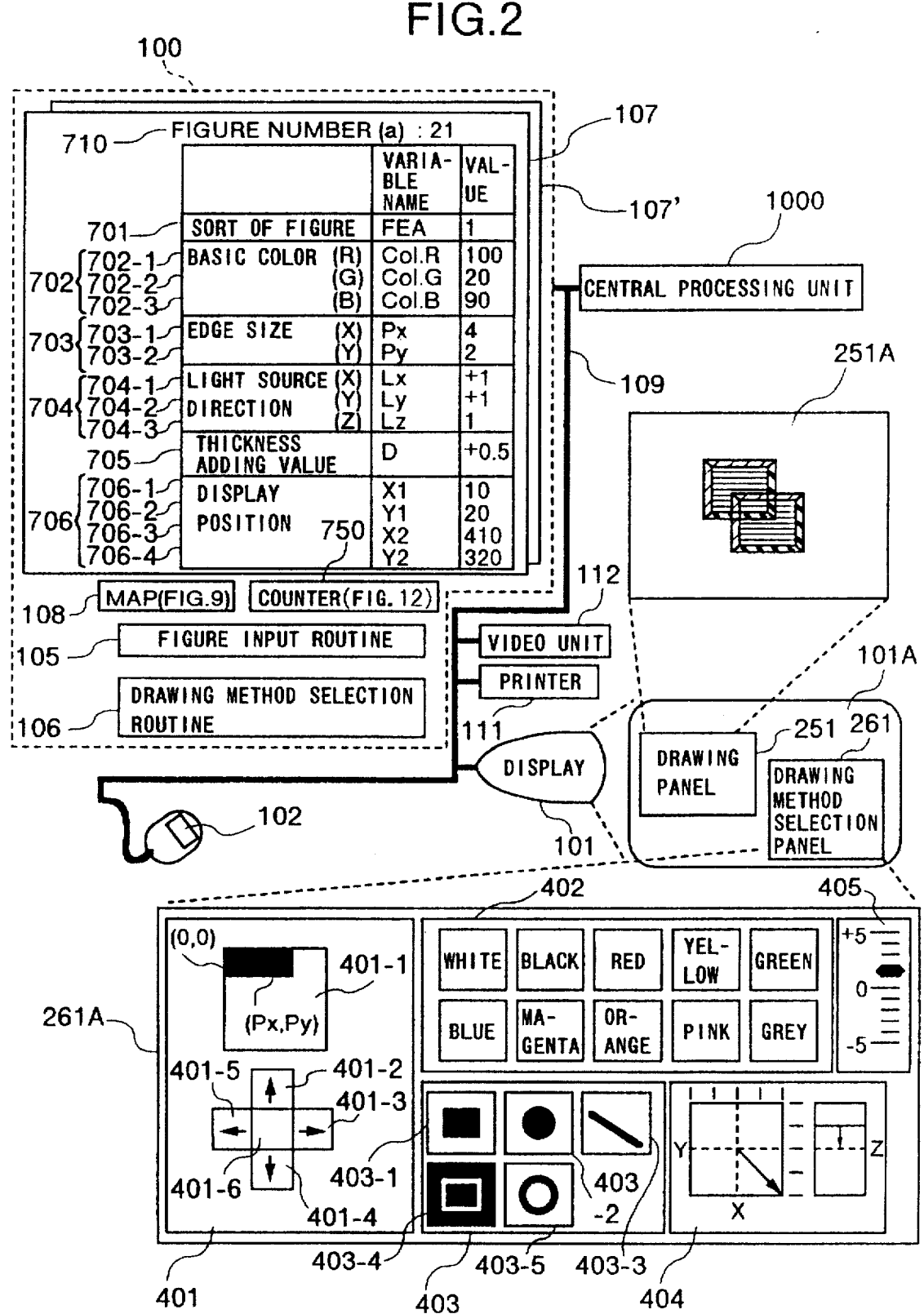
FIG. 2 is a schematic block diagram for showing an arrangement to perform a figure drawing method according to an embodiment of the present invention.

FIG. 2 is a schematic block diagram for indicating an example of an arrangement of a computer system for realizing the figure drawing method according to an embodiment of the present invention. The computer system is arranged by a central processing unit 1000, a memory (e.g., ROM and RAM) for storing data, or a program to realize this figure drawing method, a display unit 101 such as a CRT and an LCD, and a pointing device 102 equipped with an operation switch or button such as a mouse and a light pen, and further an output unit connected to the computer system, for instance, a printer 11 and a video unit 112. These constructive elements 100, 101, 102, 111 and 112 are connected via the respective buses 109 to the central processing unit 1000.

Into the memory 100, there are stored a program such as a drawing method selection routine 106, data such as a data table 107, and further a brightness convening table 108. A drawing panel 251 into which a figure is drawn by a user is represented in a display screen 101A of the display unit 101. Further, a drawing method selection panel 261 for selecting a figure to be drawn and a method for drawing this figure is displayed within the display screen 101A. The drawing method selection panel 261 includes an edge size setting panel 401 for setting a size of an edge of a figure to be drawn which is selected by a user; a basic color selecting panel 402 for selecting a display color of the figure; a thickness adding value setting panel 405 for setting a thickness (height) along the vertical direction with respect to the display plane of the figure (namely, height from the edge portion of this figure of a specific region of the figure); and a light-source-direction setting panel 404 for setting a light incident direction (light source direction) from a light source, which is illuminated to the figure. The information set by these panels is stored into the data table. Also, enlarged drawings 251A and 261A of these two panels 251 and 261 are represented in FIG. 2. The data table 107 is employed for each of the drawn figures, and figures displayed by this data table are discriminatable by way of values (e.g., 21 of example of FIG. 2) of variable names (a) about figure number 710. As a consequence, in case of example of FIG. 2, 107' is provided as another data table for another display figure.

In the computer system with such an arrangement, when the drawing method selection panel 261 is selected by the pointing device 102, a user sets with employment of this drawing method selection panel 261, a sort of a figure to be drawn, an edge size of this figure, a basic color of this figure, thickness (height) of this figure, and a light source direction with regard to this figure in accordance with the drawing method selection routine 106. As a result, these setting values are set into the data table. When the drawing panel 251 is selected by the pointing device 102, such a figure set by the above-explained drawing method selection routine is drawn in accordance with the figure input routine 105 based on the positions of the cursor defined when the button of the pointing device 102 is depressed and released, and also the above-described setting information of the data table 107. The figure set and displayed on the display plane of the display unit 101 may be outputted to the printer 111 and the video unit 112.

In the data table 107, the respective values related to a sort of FIG. 701 drawn by a user, a basic color 702 (702-1 to 702-3), an edge size 703 (703-1 to 703-2), a light source direction 704 (704-1, 704-3), and an adding value for a thickness (height) of the figure, are initialized as default values when the program is initiated. These values are changed on the drawing method selection panel in accordance with the above-described method (refer to a flow chart when in FIG. 6, will be described later).

In the case that a drawing operation is newly commenced during the program initiation, for instance, the overall region of the drawing panel 251 is wholly coated in white, and an input issued from the pointing device by the user is waited. When the user selects the drawing panel 251 by using the pointing device, a value of the display position 706 (706-1 to 706-4) in the data table 107 is updated, and then a three-dimensional figure is drawn in accordance with a sequence as defined in a flow chart of FIG. 5. It should be noted that when a figure is drawn subsequent to the second drawing operation, a new figure is overwritten on the figure which has been previously drawn in accordance with the sequence shown in FIG. 5 in this embodiment.

Figure 4:
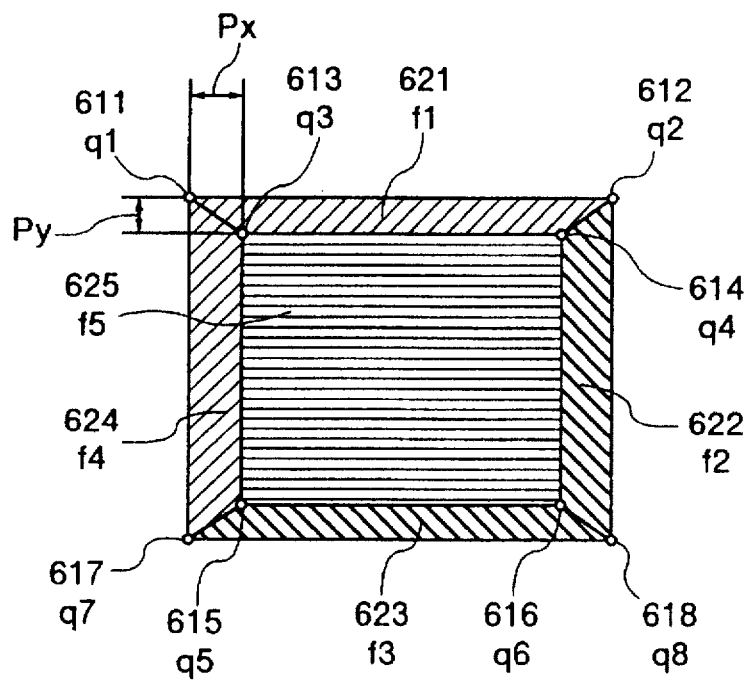
FIG. 4 schematically indicates an example of a drawn figure used to explain the figure drawing method according to the embodiment of FIG. 2.

With reference to a flow chart indicated in FIG. 5, a figure drawing method according to the present embodiment will now be explained. In this case, a rectangular FIG. 403-1 within the figure selection panel 403 is selected, and then the selected figure is three-dimensionally drawn as illustrated in FIG. 4. In FIG. 4, symbols "q1" to "q8" represent points 611 to 618 on the drawing panel, and symbols "f1" to "f5" indicate polygonal regions 621 to 625 for connecting four points preselected symbols q1 to q8. It is assumed that these polygonal region and points are preset with respect to each of figures (403-1 to 403-5). A description will now be made of a process sequence to draw the region 625 in such a manner that this region seems to be positioned upright the display plane in accordance with the flow chart of FIG. 5 (this region seems to be floated).

At a first step 631, a drawing region is set when this selected figure is drawn on the drawing panel 251. That is, first two-dimensional coordinate P(q1) of a cursor (coordinate of starting point) when the button of the pointing device 102 is depressed by the user, is read. It should be noted that symbol P(q1) represents horizontal and vertical coordinates [P(q1).h and P(q1).v] of the point q1. Furthermore, the process operation waits for a further depression of the button by the user, and reads another two-dimensional coordinate P(q8) of the cursor when the button is released (coordinate of end point). A drawing position and a drawing dimension (size) are determined by these two coordinates P(q1) and P(q8). In accordance with these two coordinates P(q1) and P(q8), the value of the display point 706 in the data table 107 is updated, and then a figure is displayed on the drawing panel 251 based on the drawing panel 251 based on the respective values of the data table 107 containing this updated display position in accordance with the below-mentioned sequence. It should be understood that values of variable names X1, Y1 at the display position of the data table 107 indicate the value of the coordinate P(q1) for the starting point, and values of variable names X2, Y2 represent values of coordinate P(q8) for the end point.

Subsequently, at a step 632, coordinates [P(q2) to P(q7)] of other points q2 to q7 are calculated by employing the coordinate values P(q1)/P(q8) of the starting point/end point, and the edge size set in the data table 107 in accordance with the following formula:

$$\left.\begin{array}{l} P(q2).h = P(q8).h, \\ P(q2).v = P(q1).v, \\ P(q3).h = P(q1).h + Px, \\ P(q3).v = P(q1).v + Py, \\ P(q4).h = P(q8).h - Px, \\ P(q4).v = P(q1).v + Py, \\ P(q5).h = P(q1).h + Px, \\ P(q5).v = P(q8).v - Py, \\ P(q6).h = P(q8).h - Px, \\ P(q6).v = P(q8).h - Py, \\ P(q7).h = P(q1).h, \\ P(q7).v = P(q8).v \end{array}\right\} \quad (1)$$

It should be noted that symbols "Px" and "Py" indicate values of edge sizes along the horizontal/vertical directions stored in the data table 107, which are set by the drawing method selection panel.

At the next step 633, as to the points q1 to q8, coordinate values [W(q1) to W(q8)] along the vertical direction with respect to the display plane are set as follows:

$$\left.\begin{array}{l} W(q1).h = 0, \\ W(q2).h = 0, \\ W(q7).h = 0, \\ W(q8).h = 0, \\ W(q3).h = D, \\ W(q4).h = D, \\ W(q5).h = D, \\ W(q6).h = D, \end{array}\right\} \quad (2)$$

It should also be noted that symbol "D" indicates a thickness adding value set on the drawing method selection panel and stored in the data table 107. As a result, it is assumed in this case that the region 625 is uniformly increased by this adding value "D" from the display plane (namely, being floated).

Subsequently, the below-mentioned operation steps will now be executed in order to calculate brightness of display colors for the respective regions f1 to f5 whereby this figure is displayed in the three dimensional manner. At a first step 634, normal vectors for each of these regions f1 to f5 are calculated. For example, in the region f1, such an equation is obtained which indicates a plane containing the below-mentioned 4 points of three-dimensional space for defining this region:

$$\left.\begin{array}{l} (P(q1).h, P(q1).v, W(q1)), \\ (P(q2).h, P(q2).v, W(q2)), \\ (P(q3).h, P(q3).v, W(q3)), \\ (P(q4).h, P(q4).v, W(q4)) \end{array}\right\} \quad (3)$$

A vector normal to the plane (i.e., normal vector) "V(f1)" is calculated based on the coefficients of this equation. Similarly, normal vectors V(f2) to V(f5) with regard to the respective regions f2 to f5 are obtained.

Subsequently, at a step 635, a calculation is made of angles E1 to E5 defined between each of these normal vectors [V(f1) to V(f5)] of the regions f1 to f5, and a light source direction set by the drawing method selection panel and stored in the data table 107. Brightness of the drawing colors of the corresponding regions f1 to f5 is calculated from the calculated angles E1 to E5. At a step 636, the respective regions are drawn based on the calculated brightness and the basic colors which are set by the drawing method selection panel and stored in the data table 107. A detailed process operation of this step 635 will be discussed with reference to FIGS. 8 and 9.

Then, a description will now be made of one example of a process operation when a user changes the values of the respective setting values 701 to 705 contained in the data table 107, which have been initialized during the program initiation, with reference to a flow chart shown in FIG. 6. When the user selects the drawing method selection panel 261 by the pointing device 102, and selects an arbitrary panel within this drawing method selection panel 261, a process operation related to this selected panel will now be carried out in accordance with the below-mentioned process operations.

At a first step 301, a judgement is made as to whether or not the cursor of the pointing device 102 is present on the edge size setting panel 401. When it is so judged that the cursor is present on the edge size setting panel, an edge size setting routine (see FIG. 7) is executed. In this routine, an edge size of a drawing to be drawn is set, and horizontal/vertical components of this set edge size are stored into value columns corresponding to variable names Px and Py of the data table 107, and thereafter this process operation is accomplished.

At a step 303, another judgement is made as to whether or not the cursor is present on the basic color selection panel 402. When it is so judged that the cursor is present on the basic color selection panel 402, the process operation is advanced to a step 304 at which a basic drawing color is selected from the basic color selection panel. Thus, values of red, green, blue components of this selected display colors are stored into the corresponding columns of the values for the variable names COL.R, COL.G, COL.B in the data table 107, whereby the process operation is ended. For example, when the figure is displayed in such 256-gradation mode for red, green, blue display color resolution, in case that the red color is selected from this basic color selection panel, values of 255, 0, 0 are stored into the variable names COL.R, COL.G, COL.B. When the grey color is selected, values of 128, 128, 128 are stored in the variable names COL.R, COL.G, COL.B.

At the next step 305, a check is done as to whether or not the cursor is located on the figure selection panel 403. When it is so judged that the cursor is present on the figure selection panel, a selection is made at a step 306 of a figure to be drawn from such figures as an ellipse 403-5, a painted over ellipse 403-2, a rectangular frame 403-4, a painted over rectangle 403-1, and a straight line 403-3. Also, the number allocated to the selected figure is stored into the column of the value corresponding to the variable name FEA of the data table 107, and the process operation is accomplished. In this case, the painted over rectangle 403-1 is selected and the value of 1 is stored.

At the subsequent step 307, a judgement is made whether or not the cursor is positioned on the light source direction setting pulse 404. When it is so judged that the cursor is present on the light source direction setting panel, at a step 308, components of horizontal (x-axis), vertical (z-axis), and depth (y-axis) directions of the light source are set, these components are stored into the columns of the values corresponding to the variable names Lx, Ly, Lz of the data table 107, and then the process operation is ended. In order that the drawn figure seems to be floated, it is so set that the light is illuminated from the upper left direction to the lower right direction (otherwise, from lower left direction to the upper right direction) on the display plane. Conversely, in order that the drawn figure seems to be sunk, it is so set that the light is illuminated from the lower right direction to the upper left direction (otherwise, from the upper right direction to the lower left direction).

In other words, for example, when it is so set that the light is illuminated from the lower right direction to the upper left direction (otherwise, from upper right direction to lower left direction, components of the light illumination direction along the x, y, z directions with respect to the light source are set as illuminated in the panel 404 of FIG. 2.

Figure 3:
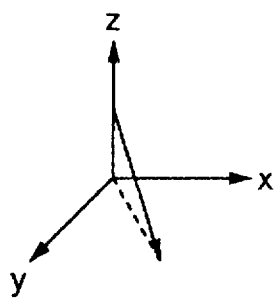
FIG. 3 is an explanatory diagram for explaining a light source direction setting method in a light source direction setting panel of FIG. 2.

The light illumination directions of this case is schematically indicated in FIG. 3.

Next, at a step 309, a judgement is made whether or not the cursor is positioned on the thickness adding value setting panel 405. When it is so judged that the cursor is present on the thickness adding value setting panel, the thickness (height) of the figure to be drawn is set at a step 310, and this value is stored into the column of the value corresponding to the variable name D of the data table 107, whereby the process operation is accomplished. When the light source direction is fixed, the variable name D is selected to a positive value in order that the drawn figure seems to be floated, whereas the variable name D is selected to a negative value in order that the drawn figure seems to be sunk conversely.

Then, as to the edge width setting routine (step 302) employed in the process operation of FIG. 6, a description will now be made of FIG. 7.

First, at a step 801, a judgement is made as to whether or not the cursor of the pointing device 102 is located on the region 401-1. When the size of edge has been previously set, the cursor is positioned on a desirable place within this region 401-1. As a result, when it is so judged that the cursor is located on the region 401-1, the process operation is advanced to a step 802. At this step 802, coordinates Px and Py of the cursor along the horizontal and vertical directions within the region 401-1 where, for example, an upper left corner is recognized as an origin, are read out, and then these coordinate values are stored into the columns of values corresponding to the variable names Px, Py of the data table 107.

Subsequently, in case that the size of edge is set, the cursor is successively positioned on any of the regions 401-2 to 401-6. First, a check is done as to whether or not the cursor is present on the region 401-2 at a step 803. When it is so judged that the cursor is located on the region 401-2, it case that the value Py is larger than, or equal to 2, the value Py is counted down, and then the counted down value is stored into the column of the value corresponding to the variable name Py of the data table 107.

At a step 807, a check is done whether or not the cursor is present on the region 401-4. When it is judged that the cursor is located on the region 401-4, the value Py is counted up, and then the counted up value is stored into the column of the value corresponding to the variable name Py of the data table 107.

At a step 809, another judgement is made whether or not the cursor is located on the region 401-5. When it is so judged that the cursor is located on the region 401-5, the process operation is advanced to a step 810 at which when the value Px is greater than, or equal to 2, the value Px is counted down, and then the counted down value Px is stored into the column of the value corresponding to the variable name Px of the data table 107.

At a step 811, a check is done as to whether or not the cursor is located on the region 401-6. When it is so judged that the cursor is on the region 401-6, the process operation is advanced to a step 821 at which a check is done as to whether or not the value Px is equal to Py. In case of Px=Py, the values of Px and Py are counted up, respectively, at a step 822. On the other hand, when the value Px is not equal to the value Py, "1" is substituted for the respective values Px and Py, and the resultant values Px and Py are stored into the columns of the values corresponding to the variable names Px and Py of the data table 107.

Subsequently, the drawing color calculation routine effected at the step 635 of FIG. 5 will now be explained with reference to FIG. 8 and FIG. 9. In this case, as to the respective regions f1 to f5, a normal vector of the respective region planes is compared with a vector of a light incident (illumination) direction (light source direction), and a brightness coefficient of a drawing color with respect to each of the region planes is calculated. Next, these calculated coefficients are multiplied by the values of the respective basic colors shown in the color information (702-1 to 702-3) of the data table 107 with respect to the respective regions, and brightness of the respective basic colors in the relevant region is calculated.

Figure 8:
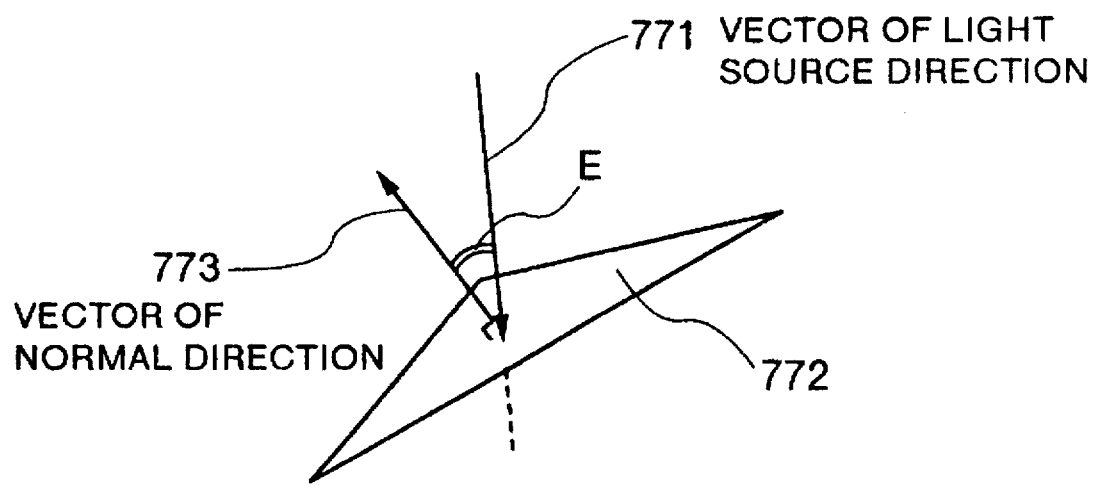
FIG. 8 is an explanatory diagram for explaining a method for calculating an angle between a direction of a light source and a normal vector of a drawing region whose brightness is calculated in the embodiment of FIG. 2.
Figure 9:
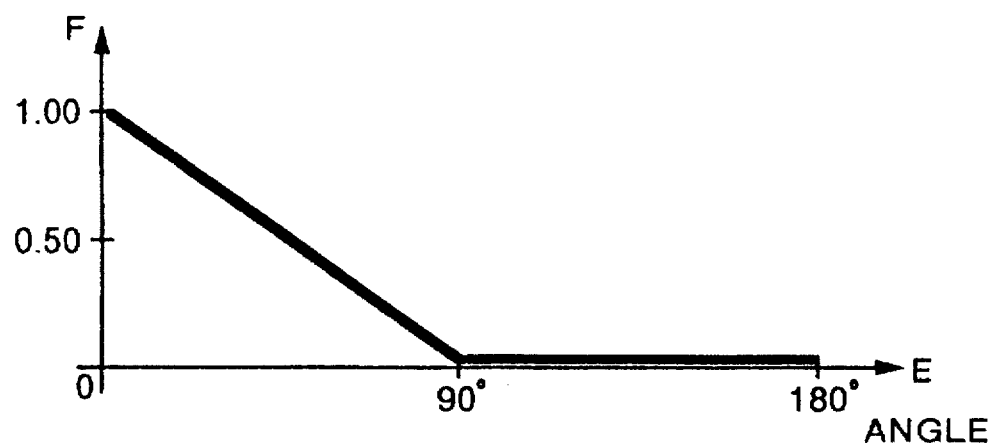
FIG. 9 schematically represents an example of a relationship between brightness of the drawing region and the angle calculated in FIG. 8.

In FIG. 8, reference numeral 771 indicates a vector along the light source direction (Lx, Ly, Lz), reference numeral 772 denotes a polygonal region to be drawn (indicated by triangle in this case), and reference numeral 773 shows a normal vector (Vx, Vy, Vz) of this polygon. First, angle "E" between the vector "L" and the vector "V" is calculated. As illustrated in FIG. 9, a relationship between the angle E and the coefficient F (F≦1) of brightness is previously obtained, and then is stored into the memory 100 as a table 108. Based on this table, the coefficient "F" of brightness is obtained from the obtained angle E. Next, the respective calculated coefficients "F" are multiplied by values corresponding to the red component "COL.R", the green component "COL.G", and the blue component "COL.B" of the basic color selected from the color selection panel 402 within the drawing method selection panel, so that brightness of the respective color components is obtained. The region is drawn based on the obtained brightness for the respective color components (step 636). Similarly, the above-described process operation is carried out for all of the regions f1 to f5, thereby drawing the respective regions.

With the above-described process operation, the figure can be three-dimensionally drawn.

As previously described, in this embodiment, a designation is made of a size and a position of a figure to be drawn. Another designation is made of a thickness (height) of a region having a certain thickness within this figure to be drawn. Furthermore, a illumination (incident) direction of a light source toward this figure is designated, so that this figure can be three-dimensionally displayed. It should be noted that when a plurality of figures are drawn i the overlapping mode, a drawing process for a new figure is carried out in accordance with the process operation of FIG. 5 subsequent to the above-described process operation. In this case, the portion of the firstly drawn figure, overlapped with the newly drawn figure is erased.

Next, a description will now be made of another embodiment of the present invention, in which a figure is newly overwritten on a previously drawn figure. An arrangement of this embodiment is featured to further employ a thickness (height) counter table 750 (FIG. 12A) within the memory 100 of the first embodiment shown in FIG. 2. In this embodiment, there is provided such a thickness counter table 750 equipped with thickness counters corresponding to the respective pixels of the drawing panel (reference numeral 251 of FIG. 1) with, for instance, one-to-one correspondence, and these counters are counted up every time a figure is drawn thereby displaying the figure in a quasi-three-dimensional representation. As a consequence, when a new figure is overwritten on the previously drawn figure, since the overwrite effect (namely, a new figure being overwritten on the plane of the previously drawn figure), figures having thicknesses with material feeling can be drawn.

Figure 11:
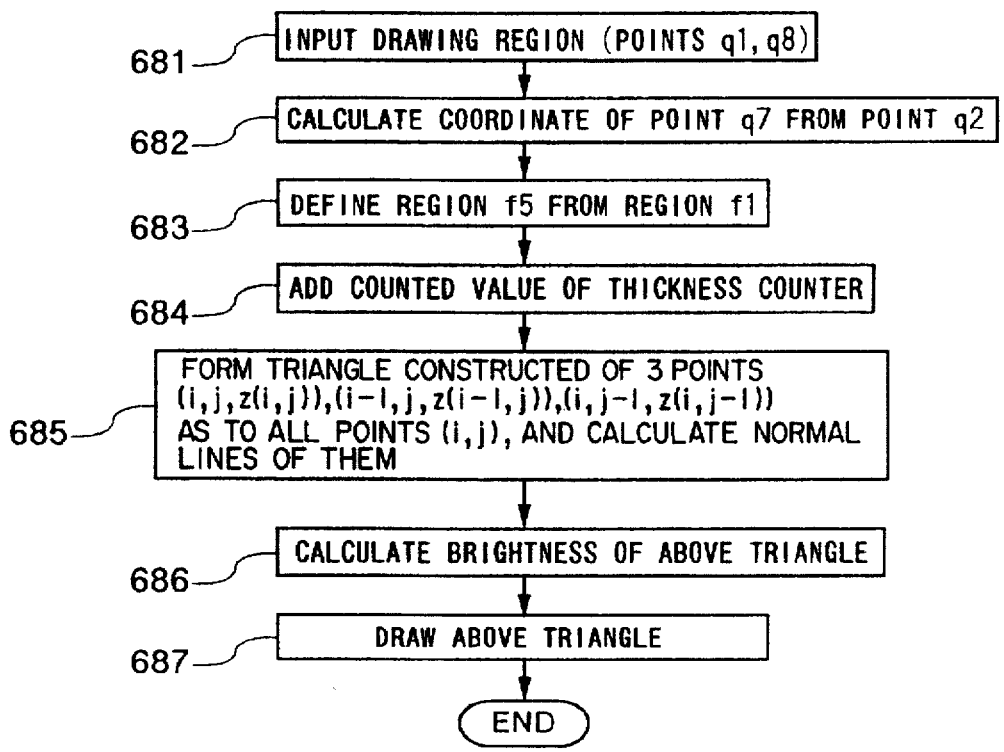
FIG. 11 is a flow chart for explaining an example of the figure drawing method according to another embodiment of FIG. 10.

A drawing operation according to this embodiment will now be explained with reference to a flow chart indicated in FIG. 11.

When the drawing operation is newly commenced and the program is initiated, the overall region of the drawing panel (reference numeral 251 of FIG. 2) is pained over with white. In case that the drawing panel 251 is selected by the user with the pointing device 102, the figure is drawn in accordance with the sequential operation indicated in FIG. 11.

Figure 10:
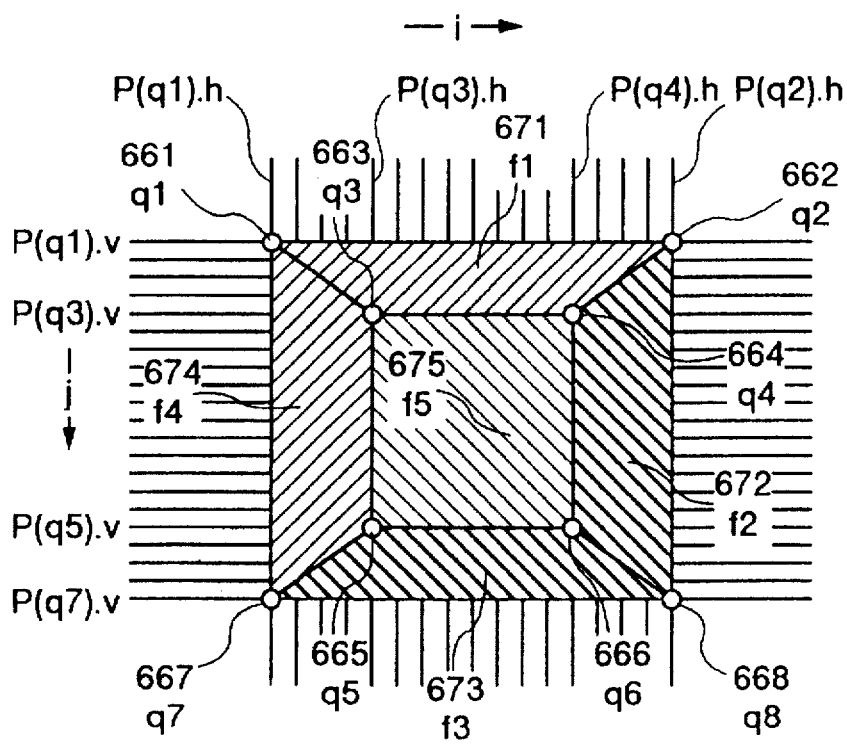
FIG. 10 schematically illustrates an example of a drawn figure for explaining another figure drawing method according to another embodiment of the present invention.

The thickness counter table 750 indicates count values of software counters corresponding to, for example, all pixels of the display plane of the drawing panel 251. The count value represents thickness (height) of the corresponding pixel. That is, as represented in FIG. 12A and FIG. 12B, the thickness counter table 750 indicate the count value of the software counters corresponding to all of the pixels of the display plane of the drawing panel 251. For instance, when the figure drawn in FIG. 10 is indicated by 16 pixels along an i-direction (horizontal direction: x-axis direction), and by 20 pixels along a j-direction (vertical direction: y-axis direction), also, a region f4 (674) is drawn in such a manner that the region f4 has a predetermined height (for example, thickness 4), and other regions f1 to f4 (671 to 674) are inclined from outer peripheral edge portions thereof to this region f5, the count values of the respective counters are indicated in FIG. 12B.

These count values of the respective counters are entirely reset to 0 when the drawing operation is newly (firstly) commenced. In this embodiment, either when another figure is overwritten on the firstly drawn figure, or when a figure is drawn subsequent to the second drawing operation, count values corresponding to a thickness of a newly drawn figure are added (i.e., counted up) to the present count values without resetting the count values of the thickness counters, so that the count values of the counters represent the added thickness of the plural figures.

Then, the drawing method according to this embodiment will now be described with reference to the flow chart of FIG. 11. The flow chart of FIG. 11 shows such a drawing example that, for instance, the figure 403-1 is selected from the figure selection panel 403, and the rectangular figure selected and shown in FIG. 10 is inputted into a region of a drawing panel where no figure is drawn. It should be noted that all of the below-mentioned points (coordinates) correspond to pixels in one-to-one correspondence.

Figure 5:
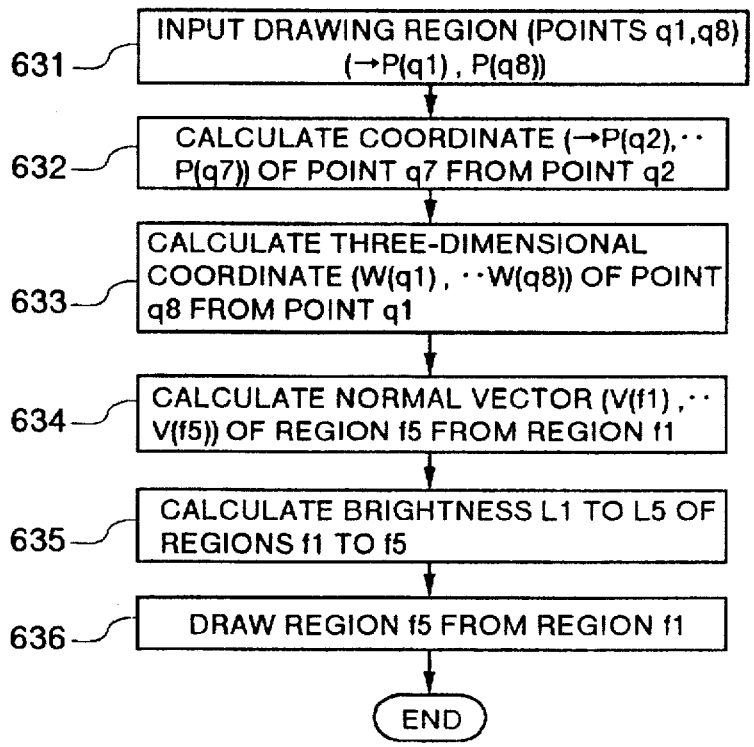
FIG. 5 is a flow chart for describing an example of the figure drawing method in the embodiment of FIG. 2.

First, similar to the step 631 of FIG. 5, the user inputs a point "q1" and a point "q8" in order to define a drawing region at a step 681. As a consequence, a figure drawing operation is carried out in the following sequential operation in order that such a trapezoidal figure can be three-dimentionally drawn. This trapezoidal figure is constructed in such a manner that a rectangle with a diagonal line, i.e., a line segment for connecting these two points q1 and q8 functions as a lower bottom of this trapezoidal figure, and another rectangle f5 inside this rectangle functions as an upper bottom thereof.

At a step 681, when the points "q1" and "q8" are inputted, a calculation is made of coordinate values from the point q2 to the point q7 at a step 682 in a similar manner to the step 632, so that horizontal and vertical coordinate values of the points q2 to q7 similar to those shown in the above-described formula (1) are obtained. Similar to the above-described embodiment, for instance, P(q2).h and P(q2).v denote the horizontal and vertical coordinate values of the point q2. Furthermore, Px and Py are set on the drawing method selection panel, and represent the edge sizes along the horizontal and vertical directions, which have been stored in the data table:

$$\left.\begin{array}{l} P(q2).h = P(q8).h, \\ P(q2).v = P(q1).v, \\ P(q3).h = P(q1).h + Px, \\ P(q3).v = P(q1).v + Py, \\ P(q4).h = P(p8).h - Px, \\ P(q4).v = P(q1).v + Py, \\ P(q5).h = P(q1).h + Px, \\ P(q5).v = P(q8).v - Py, \\ P(q6).h = P(q8).h - Px, \\ P(q6).v = P(q8).v - Py, \\ P(q7).h = P(q1).h, \\ P(q7).v = P(q8).v \end{array}\right\} \quad (4)$$

Thereafter, definitions are made of the regions from f1 to f5 at a step 683 as follows:

Region f1: rectangle surrounded by points q1, q2, q3, q4.
Region f2: rectangle surrounded by points q2, q4, q6, q8.
Region f3: rectangle surrounded by points q5, q6, q8, q7.
Region f4: rectangle surrounded by points q1, q3, q5, q7.
Region f5: rectangle surrounded by points q3, q4, q6, q5.

Next, at a step 684, the respective count values Z(i,j) (indicating coordinate value along Z-axis direction) of the thickness counter table 750 are counted up as shown below. It is assumed that the counters are provided for each pixel of the drawing panel 251, the coordinate (namely, pixel number) along the horizontal direction (x-axis direction) of the drawing panel 251 is "i", and the coordinate (namely, pixel number) along the vertical direction (y-axis direction) thereof is "j". It is also assumed that the count value of the counter corresponding to the coordinate (pixel) (i, j) is Z(i,j). Accordingly, the count values Z(i, j) of the coordinates (pixels) (i, j) at the respective regions 671 (f1) to 675 (f5) are obtained from the below-mentioned calculations: It should be noted that Zo(i, j) is an initial count value (present count value) (namely, count value before new drawing) corresponding to the coordinate (pixel) (i, j). Symbol "D" corresponds to a thickness value stored in the data table, and indicates a thickness (height) from the peripheral portion of the region 675 (f5).

Z(i, j) within region 671:

$$Z(i,j)=Zo(i,j)+\{(j-P(q1).v)/P(q3).v-P(q1).v)\}D \quad (5)$$

Z(i, j) within region 672:

$$Z(i,j)=Zo(i,j)+\{(P(q2).h-i)/P(q2).h-P(q4).h)\}D \quad (6)$$

Z(i, j) within region 673:

$$Z(i,j)=Zo(i,j)+\{(P(q1).v-j)/P(q7).v-P(q5).v)\}D \quad (7)$$

Z(i, j) within region 674:

$$Z(i,j)=Zo(i,j)+\{(i-P(q11).v)/P(q3).h-P(q1).h)\}D \quad (8)$$

Z(i, j) within region 675:

$$Z(i,j)=Zo(i,j)+D$$

In other words, for instance, the count value Z(i,j) of each coordinate (i,j) within the region 671 (f1) is defined by the formula (5) and determined as follows: That is, since the region 671 is inclined along the j-direction, the height thereof is constant along the i-direction and increased along the j-direction. As a consequence, a count value (z-axis coordinate) of an arbitrary coordinate (i,j) of the region 671 is equal to such a value defined by adding an initial count value Zo(i,j) to a product between a subtraction (j−P(q1).v) of this coordinate value from the point q1 along the j-direction, and an inclination (D/P(q3).V−P(q1).V) of this region along the j-direction. With this manner, the count values Z(i,j) of the respective coordinates (i,j) within the region 671 (f1) are defined by the formula (5), and the count values of other regions 672 to 674 (f2 to f4) are similarly defined by the formulae (6) to (8). The count value Z(i,j) of the region 675 is equal to such a value obtained by adding D to the initial count value Zo(i,j) as shown in the formula (9). Thus, the count values (coordinate values along Z-axis direction) are calculated with respect to all points (coordinate values) of the drawing regions (671 to 675).

Figure 13:
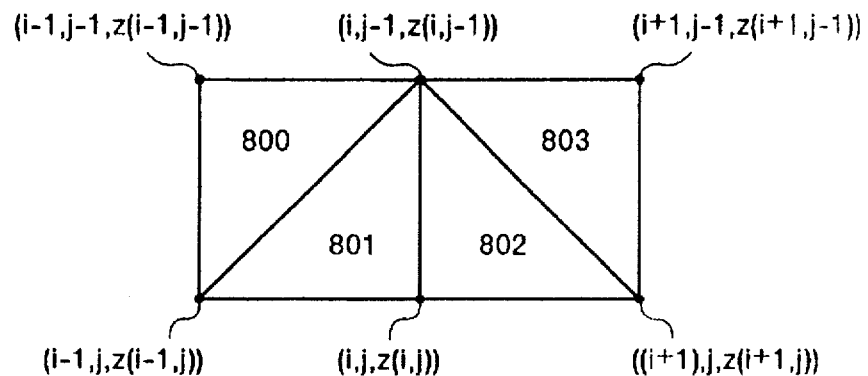
FIG. 13 is an explanatory diagram for explaining a method for sectioning the draw region into a plurality of triangles so as to calculate brightness of a drawing color in the embodiment of FIG. 10.

Then, at a step 685, the drawing regions (regions 671 to 675), namely the regions for satisfying P(q1).h≦i≦P(q2).h and P(q1).V,j,P(q7).V are segmented into polygons in which at least three points are vertexes (triangles in which the three adjacent points are vertexes in this case), so that normal vectors of the respective triangles are obtained. For instance, when X, Y, Z coordinates of each point is expressed as (i, j, z(i,j)), as represented in FIG. 13, a single triangle 801 is formed by employing three adjoining arbitrary points (i,j,Z (i,j).(i−1,j,Z(i−1,j)),(i,j−1,Z(i,j−1)). Similarly, other triangles 800, 802, 803 are formed by the three adjoining points.

As described above, after all of the drawing regions are segmented into triangles, normal vectors positioned perpendicular to the planes of these triangles are obtained at a step 686 in a similar manner to that of the step 634.

At the subsequent step 686, brightness of each of base colors as to the respective triangles is obtained from the resultant normal vector and the incident direction of the light source stored in the data table 107 in a similar manner to that of the step 635, and at a step 687, the respective triangles are drawn in a similar manner to that of the step 636.

As illustrated in FIG. 10, the figure is three-dimensionally displayed in the drawing region in accordance with the above-described manner.

Figure 14:
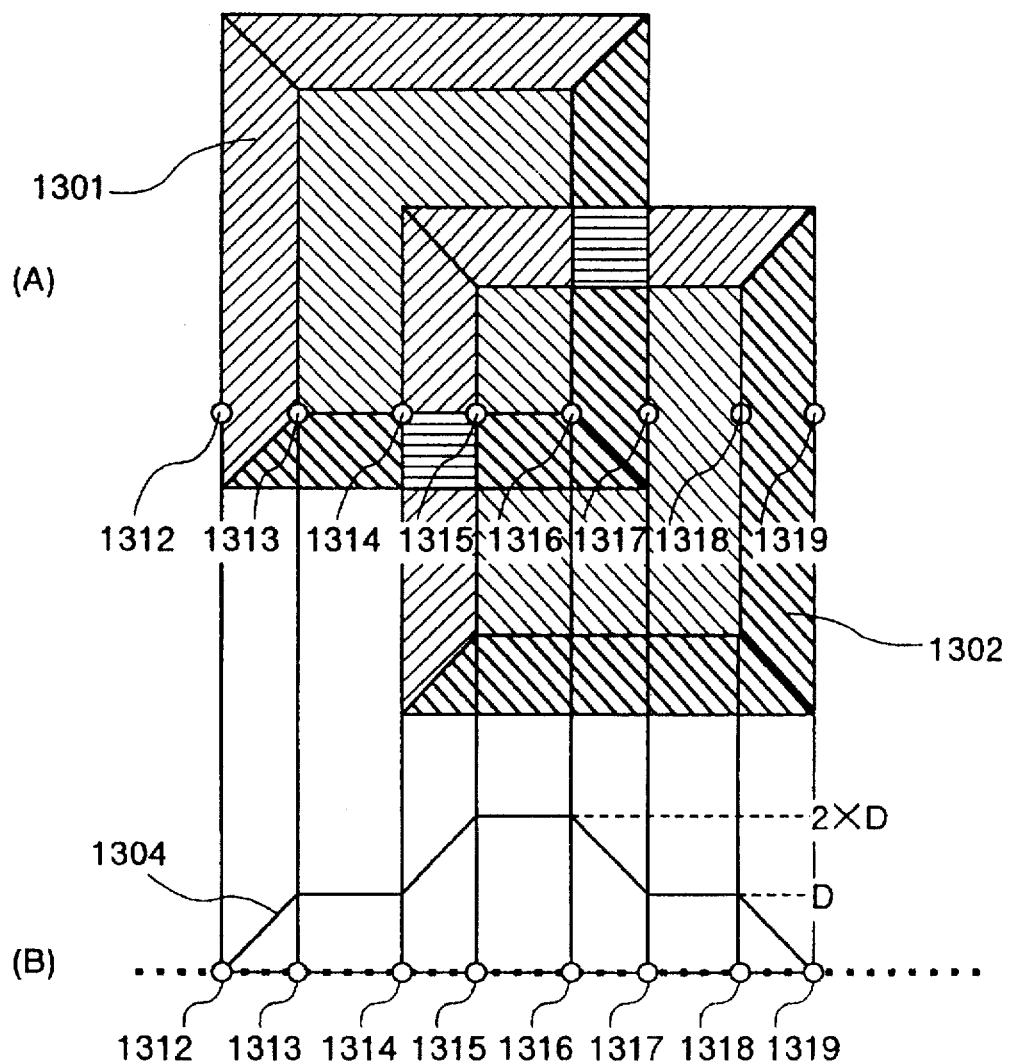
FIG. 14 schematically shows an example of a drawn figure when two figures are drawn under overlapped condition, and an example of count values of a counter table in this case according to the embodiment of FIG. 10.

Next, a description will now be made of such a case that a figure is newly overwritten on the previously drawn figure in accordance with FIG. 14. A process sequence executed in the computer when a figure is newly overwritten is the same as shown in FIG. 11. In FIG. 14(A), reference numeral 1301 indicates a previously drawn figure, and reference numeral 1302 represents a newly overwritten figure. A polygonal line 1304 of FIG. 14(B) represents count values of thickness counters at the respective coordinates on a line segment for connecting a coordinate (pixel) 1312 with a coordinate (pixel) 1319 of FIG. 14(A). As represented in FIG. 14(A), according to this embodiment, it is so represented that within such a region where two drawings are overlapped, the newly drawn figure is overlapped on the previously drawn figure.

A description will now be made of a third embodiment of the present invention, in which the first embodiment of the present invention has been applied to draw wiring patterns while an integrated circuit (IC) is designed.

Figure 15:
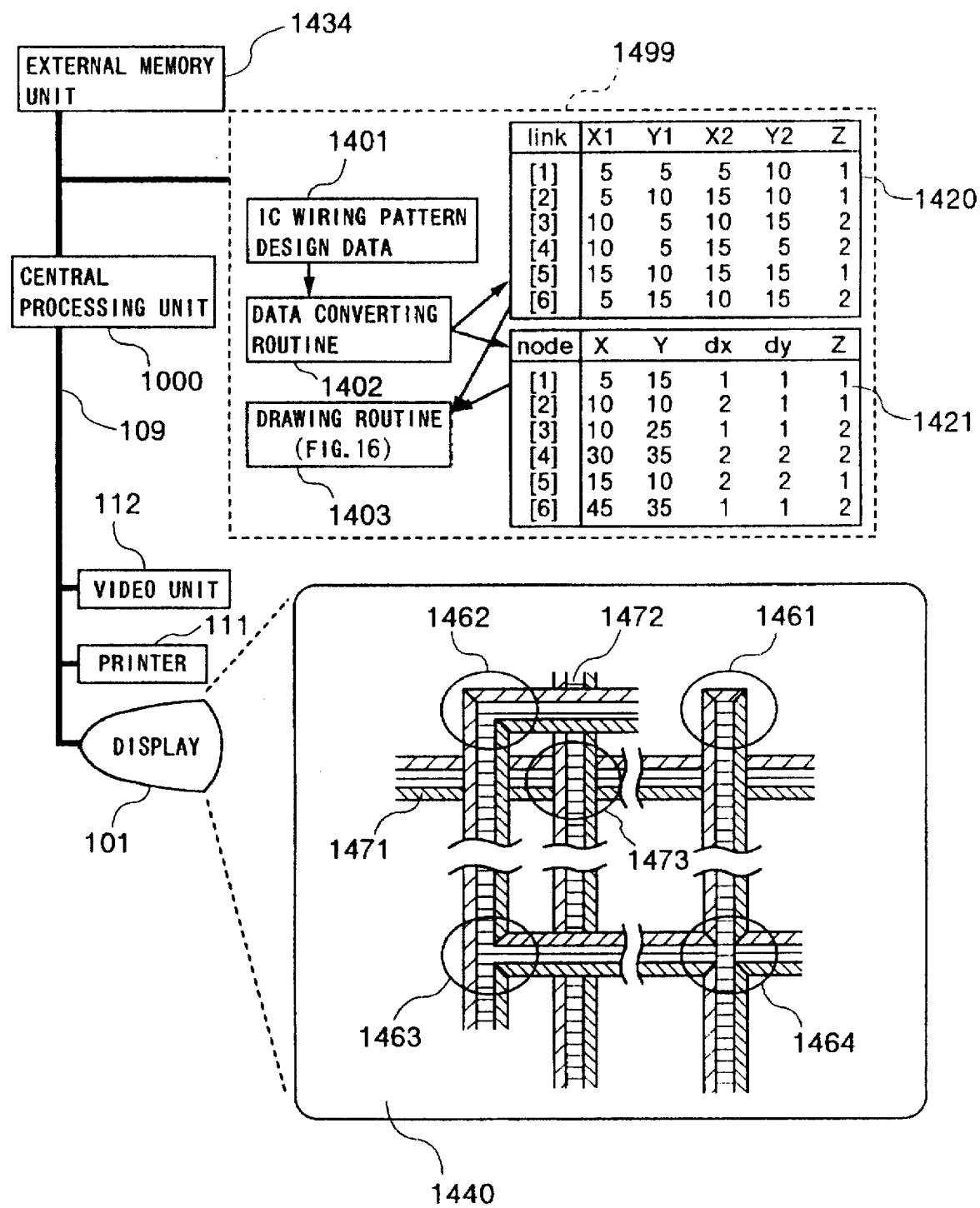
FIG. 15 is a schematic block diagram for showing an arrangement to perform a figure drawing method according to a further embodiment of the present invention.

In this embodiment, an expression in the thickness direction (three-dimensional display) is made for each layer of the wiring patterns, and the respective wiring patterns are three-dimensionally represented, so that such a multilayer wiring pattern as indicated by reference numeral 1440 of FIG. 15 may be drawn and outputted.

FIG. 15 shows an arrangement of a computer system according to this embodiment. In this drawing, the same reference numerals of FIG. 2 will be employed as those for indicating the constructive elements having the same functions, and explanations thereof are omitted. In FIG. 15, reference numeral 1499 indicates a memory for storing a program, or data. Reference numeral 1434 shows an external memory device for storing therein IC wiring design data such as logic circuit data used to design an IC, and layout data about transistor and the like. Reference numeral 1440 shows an example of output results of IC wiring patterns according to the present invention, which are outputted to these output devices. Similar to the embodiment of FIG. 2, the memory 1499 owns a data table 107, a figure input routine 105, a drawing method selection routine 106, and a map 108 also in this embodiment, although not shown in this figure.

Subsequently, a figure drawing operation according to this embodiment will now be described.

First, the IC wiring pattern design data 1410 stored in the external memory unit 1434 is read out from the external memory unit 1434 and written into an internal memory 1499 of the computer. The read IC wiring pattern design data 1410 is converted into link data and node data by a data converting routine 1402, and these link data and node data are stored into a link data table 1420 and a node data table 1421, respectively. The link data is constructed of horizontal/vertical coordinates (X1, Y1) of a starting point of wiring data, horizontal/vertical coordinates (X2, Y2) of an end point thereof, and the number (Z) of wired layers. The node data is arranged by a coordinate (X, Y) of a node positioned at the starting point, or the end point of the above-described link data, widths (sizes) along the horizontal/vertical directions (dx, dy), and the number (z) of positioned layers. In the drawing routine 1403, the wiring data is outputted to the external units such as the display 101, the printer 111, and the video unit 112, as illustrated by 1440 by employing the link data (otherwise, link data and node data).

In accordance with this embodiment, since the wiring patterns of the plural layers are overwritten thereon and also the wiring patterns of the respective layers are three-dimensionally drawn, it could be at a glance recognized that as shown by 1473, wiring patterns 1472 and 1471 in the different layers are an upper layer and a lower layer, respectively.

Figure 16:
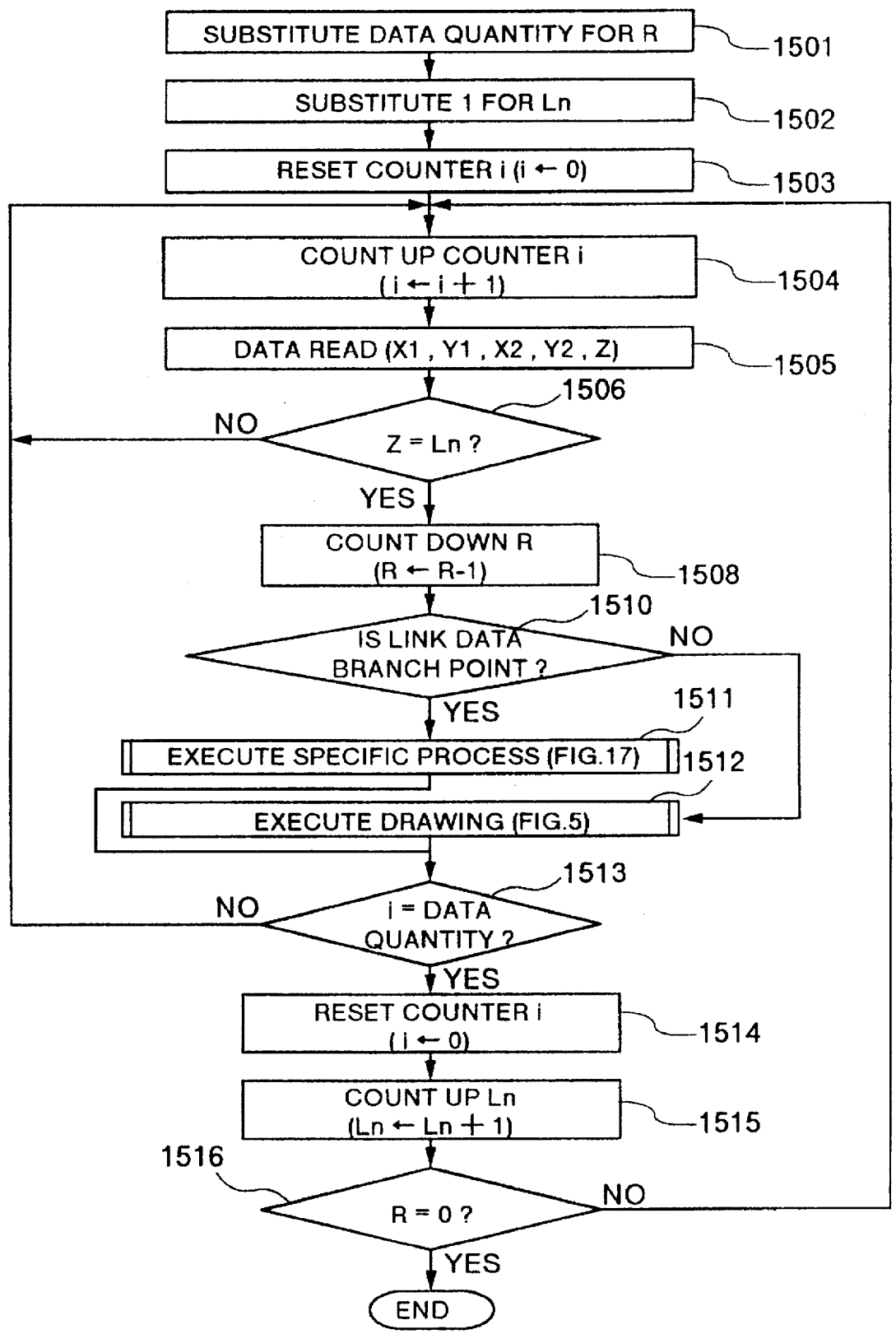
FIG. 16 is a flow chart for explaining an example of the figure drawing method according to the further embodiment of FIG. 15.

Next, a method for drawing a wiring pattern, according to this embodiment, will now be described with using a flow chart shown in FIG. 16. This drawing method is performed in accordance with the drawing routine 1403 stored in the memory 1499. In this embodiment, a description is made of such a case that a figure is drawn by employing only link data among the link data and the node data, since the node is not contained in the wiring pattern.

In this embodiment, a counter R, a counter Ln, and a counter i (not shown) are provided as software counters in the memory 1499, which count the number R of all lines of a wiring pattern to be drawn (link number of link data table 1420 shown in FIG. 15 is [1] to [6], and therefore the link number R is [6] in this case), the number Ln of wiring layers to be drawn (corresponds to value of Z of link data table 1420 shown in FIG. 15, and since number of wiring layers in this case is 2, the number Ln becomes 1 and 2), and the link number "i" to be processed, respectively.

First, at a step 1501, the all link numbers R, namely 6 in this case, are set as the value of the counter R. At a step 1502, 1 corresponding to the wiring layer number of the lowermost layer is set as the value of the counter Ln (because the wiring layer of the lower most layer is firstly drawn). At a step 1503, an initial value "0" is set as the link data number into the counter At a step 1504, the link data number "i" of the counter "i" is counted up by 1. It is assumed that "i" is selected to be "1" in this case, since the link data about the link number [1] is first processed. Next, at a step 1505, i-th (link number [1]) link data (X1, Y1, X2, Y2, Z) are read. At a further step 1506, a check is done as to whether or not "Z" is equal to "Ln" (namely, it is judged whether or not the layer number of the link number [1] is equal to 1 in this case). When "Z" is equal to Ln, since the process operation of this link data is carried out, "R" is counted down by 1 at a step 1508. Since the layer number of the link number [1] is equal to "1" in this case, the process operation is advanced to a step 1508 at which the value of the counter R is selected to be 5.

When "Z" is not equal to "Ln", the process operation is returned to a step 1504 at which the process operation of the link data about the next link number is commenced.

When the process operation defined at the step 1508 is ended, the process operation is advanced to a step 1550 at which a check is done whether or not the starting point of the link data, or the end point thereof corresponds to a branch point (i.e., point where edge point and plural wiring patterns are intersected) of a wiring pattern. When it is a judged that either the starting point of the link data, or the end point thereof corresponds to the wiring branch point, a specific process indicated in FIGS. 17A to 17D is carried out at a step 1511 (will be discussed later). Conversely, when it is so judged that either the starting point of the link data, or the end point thereof corresponds to the wiring branch point, the drawing process (three-dimensional drawing process) for the link data of this link number "i" is carried out at a step 1512, which is similar to that of the first embodiment as shown in FIG. 5.

At the subsequent step 1509, a check is done as to whether or not "i" is equal to the quantity of data (i.e., number of link data being 6 in this case). When "i" is not equal to the quantity of data, the process operation is returned to the step 1504. In this case, since the link number "i" is equal to 1, the process operation is returned to the step 1504 at which the process operation for the next link number "2" is commenced, and then a similar process operation defined at steps 1504 to 1512 is carried out. In accordance with this manner, the process operations defined at the steps 1504 to 1512 are carried out with respect to all of the link numbers "1" to "6" so as to perform the drawing process of the first layer (namely, drawing process of first layer as to link data about link numbers 1, 2, 5).

When it is so judged that "i" is equal to the quantity (i.e., 6) of data (namely, it is judged that drawing process for all link data about layer having layer number indicated by counter Ln is accomplished), the process operation is advanced to a step 1514 at which the counter "i" is reset and the count value is brought into "0". At the subsequent step 1515, the count value Ln of the counter Ln is counted up by 1 in order to perform the drawing process of the layer having the next layer number (i.e., second layer in this case).

Subsequently, at a step 1516, a check is done as to whether or not the value "R" of the counter R is equal to "0". If the count value "R" is not equal to "0", then the process operation is returned to the step 1504 at which the drawing process for the subsequent layer is carried out. If the count value "R" is equal to "0", since the drawing process for all of the layers has been completed, the drawing routine 1403 is complete.

With reference to FIG. 17A to FIG. 17D, a specific three-dimensional display process will now be described as to such a point where the edge points of the link data at the step 1511 are intersected with a plurality of wiring patterns.

Figure 17A:
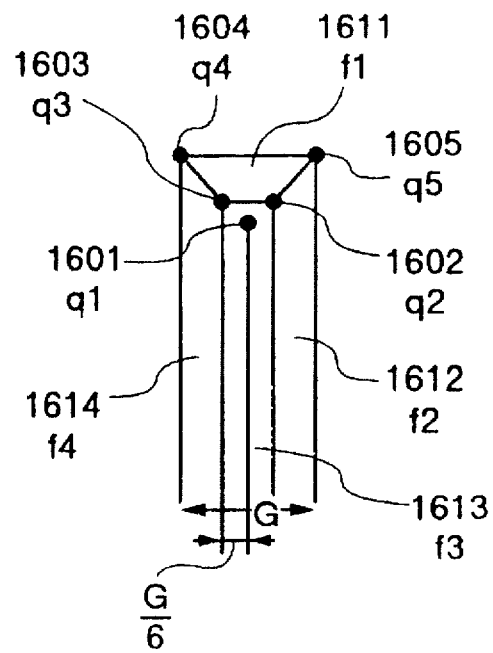
FIGS. 17A to 17D are explanatory diagrams for explanating methods for drawing various wiring patterns according to a still further embodiment of the present invention.

Referring now to FIG. 17A, a description will be made of such a case that link data becomes edge points. A point 1601 indicates either a starting point (X1, Y1) of the link data, or an end point (X2, Y2) thereof. Each of points 1602, 1603, 1604, 1605 shown in FIG. 17A is obtained as follows. It should be noted in this case that P(1602) indicates horizontal and vertical coordinates [P(1602).h and P(1602).v] about the point 1602. Also, symbol "G" denotes a width of a wiring pattern. It is assumed in this case that distances between the points "q1" and "q2", and between the points "q1" and "q3" along the horizontal/vertical directions are G/6, whereas distances between the points "q1" and "q5", and between the point "q1" and "q4" along the horizontal/vertical directions are G/2.

$$\left.\begin{array}{l}P(q2).h = P(q1).h + G/6,\\ P(q2).v = P(q1).v - G/6,\\ P(q3).h = P(q1).h - G/6,\\ P(q3).v = P(q1).v - G/6,\\ P(q4).h = P(q1).h - G/2,\\ P(q4).v = P(q1).v - G/2,\\ P(q5).h = P(q1).h + G/2,\\ P(q5).v = P(q1).v - G/2,\end{array}\right\} \quad (10)$$

Figure 6:
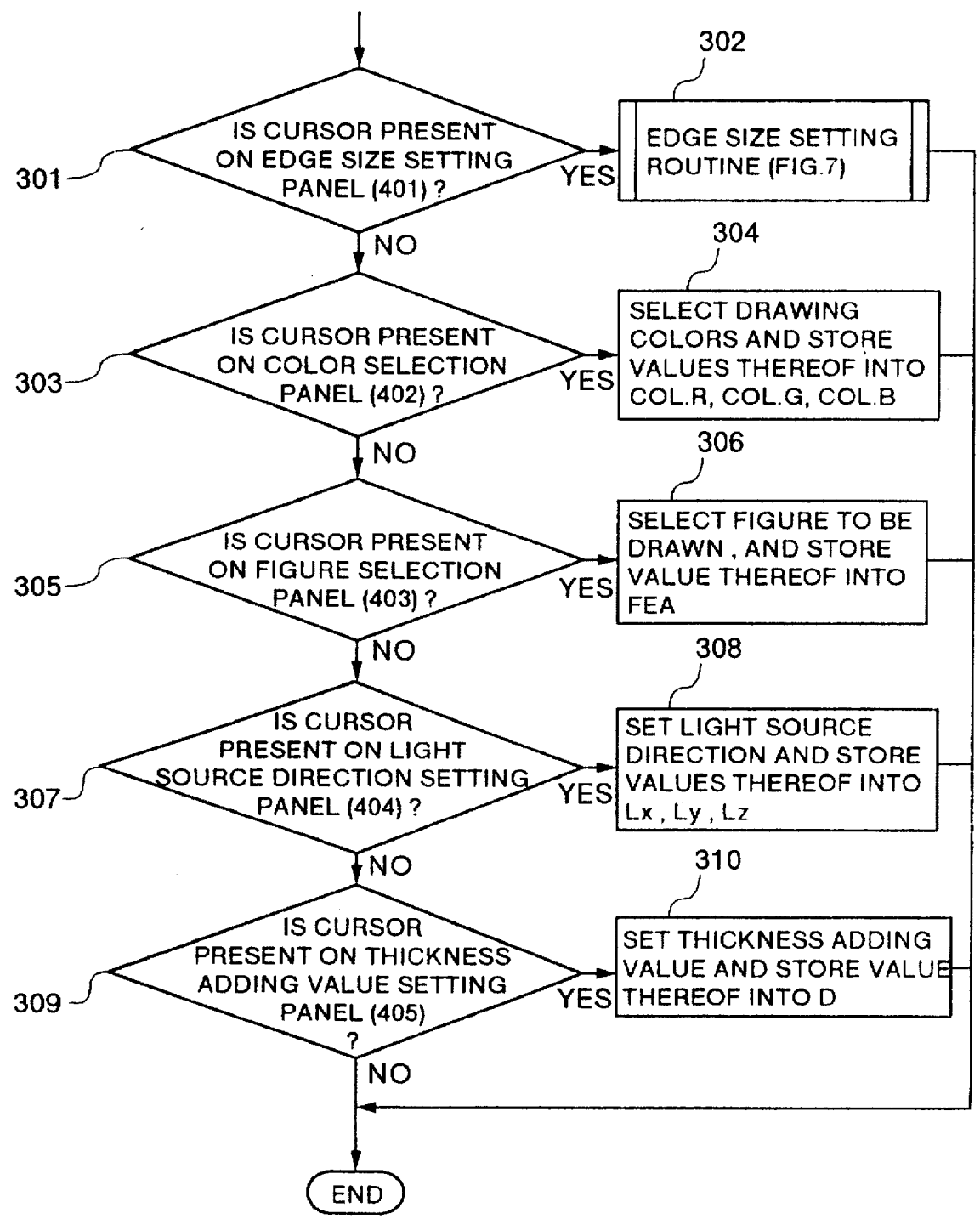
FIG. 6 is a flow chart for explaining an example of the drawing method selecting routine in the embodiment of FIG. 2.
Figure 7:
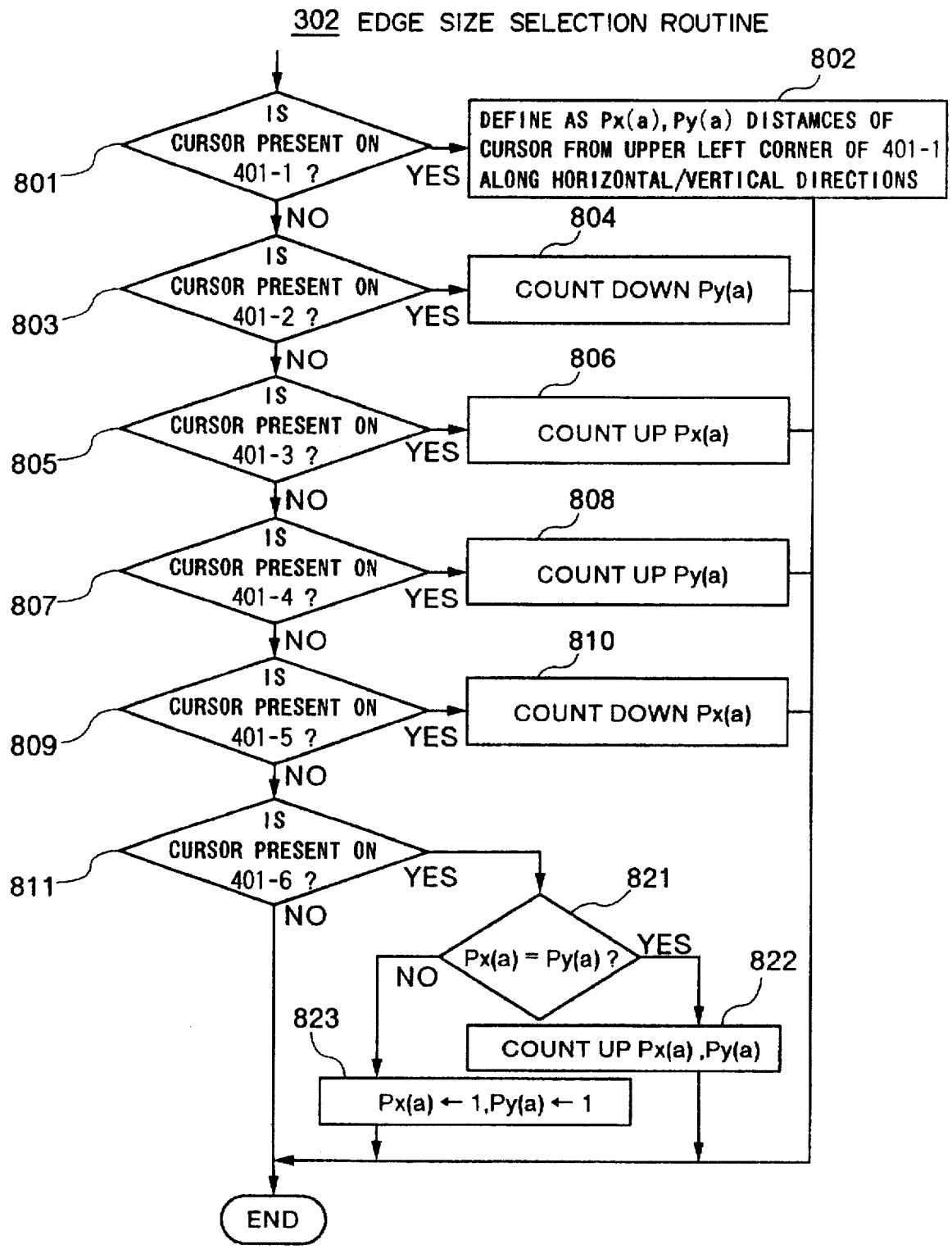
FIG. 7 is a flow chart for explaining an example of a routine to select an edge width within the figure drawing selection routine in accordance with the embodiment of FIG. 2.

Next, coordinates [W(q2) to W(q5)] along the vertical direction are set to the display of the point q2 to the point q5 in a similar manner to FIG. 6. It should be noted in this case that symbol "D" represents a thickness of a wiring pattern which has been three-dimensionally indicated.

$$W(q2)=W(q3)=D \quad (11)$$

$$W(q4)=W(q5)=0 \quad (12)$$

Thereafter, normal vectors of the regions f1, f2, f3 and f4 are obtained, and the drawing colors are calculated in a similar manner to that of FIG. 5. For example, in the region f1, such an equation is obtained which indicates a plane containing the below-mentioned four points:

$$\left.\begin{array}{l}(P(q2).h, P(q2).v, W(q2)),\\ (P(q3).h, P(q3).v, W(q3)),\\ (P(q4).h, P(q4).v, W(q4)),\\ (P(q5).h, P(q5).v, W(q5)),\end{array}\right\} \quad (13)$$

Then, a vector V(f1) perpendicular to the plane is calculated based upon the coefficients of this equation. Similarly, vectors V(f2) to V(f4) as to the regions f2 to f4 are calculated.

Figure 17B:
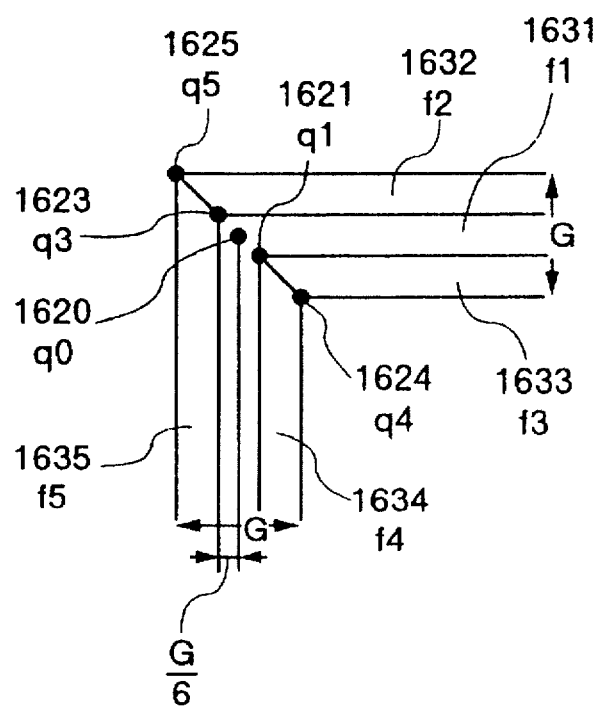

Next, with reference to FIG. 17B, a description will now be made of such a case that link data is bent at a right angle. The point "q1" indicates either a point (X1, Y1) of the link data, or a point (X2, Y2) thereof. The respective points q2, q3, q4, q5 are obtained as follows. Here, it is noted that P(q2) represents horizontal/vertical coordinates [P(q2).h and P(q2).v]. Symbol "G" denotes a width of a wiring pattern. It should also be noted that distances between the points q1 and q2, and between the points q1 and q3 along the horizontal/vertical directions are G/6, whereas distances between the points q1 and q5, and between the points q1 and q4 along the horizontal/vertical directions are G/2.

$$\left.\begin{array}{l}P(q2).h = P(q1).h + G/6,\\ P(q2).v = P(q1).v + G/6,\\ P(q3).h = P(q1).h - G/6,\\ P(q3).v = P(q1).v - G/6,\\ P(q4).h = P(q1).h + G/2,\\ P(q4).v = P(q1).v + G/2,\\ P(q5).h = P(q1).h - G/2,\\ P(q5).v = P(q1).v - G/2,\end{array}\right\} \quad (14)$$

Next, a coordinate along the vertical direction is set to the displays of the point q2 to the point q5 in a similar manner to that of FIG. 17A. Normal vectors of the regions f1, f2, f3, f4 and f5 are calculated, and the drawing colors are obtained in a similar manner to that of FIG. 5.

Figure 17C:
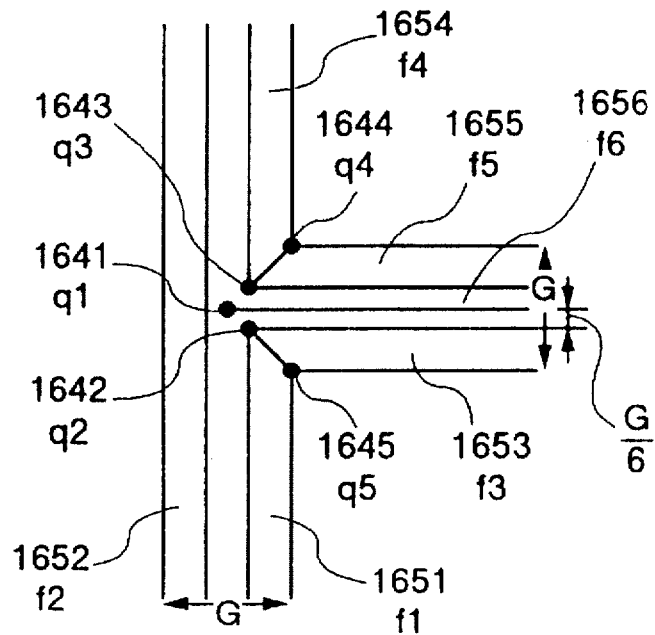

Referring now to FIG. 17C, a description will be made of such a case that three link data are intersected with each other at a right angle. The point q1 indicates either a point (X1, Y1) of link data, or a point (X2, Y2) thereof. The respective points q2, q3, q4, q5 are obtained as follows. It should be understood that P(q2) represents horizontal/vertical coordinates {P(q2).h and P(q2).v]. Further, symbol "G" denotes a width of a wiring pattern. Also, it is noted that distances between the points q1 and q2, and the points q1 and q3 along the horizontal/vertical directions are G/6, whereas distances between the points q1 and q5, and between the points q1 and q4 along the horizontal/vertical directions are G/2.

$$\left.\begin{array}{l}P(q2).h = P(q1).h + G/6,\\ P(q2).v = P(q1).v + G/6,\\ P(q3).h = P(q1).h + G/6,\\ P(q3).v = P(q1).v - G/6,\\ P(q4).h = P(q1).h + G/2,\\ P(q4).v = P(q1).v - G/2,\\ P(q5).h = P(q1).h + G/2,\\ P(q5).v = P(q1).v + G/2,\end{array}\right\} \quad (15)$$

The coordinate along the vertical direction are set to the displays of the point q2 to the point q5 in a similar manner to that of FIG. 17A, normal vectors of the regions f1, f2, f3, f4, f5 and f6 are obtained, and the drawing colors are calculated in a manner similar to that of FIG. 5.

Figure 17D:
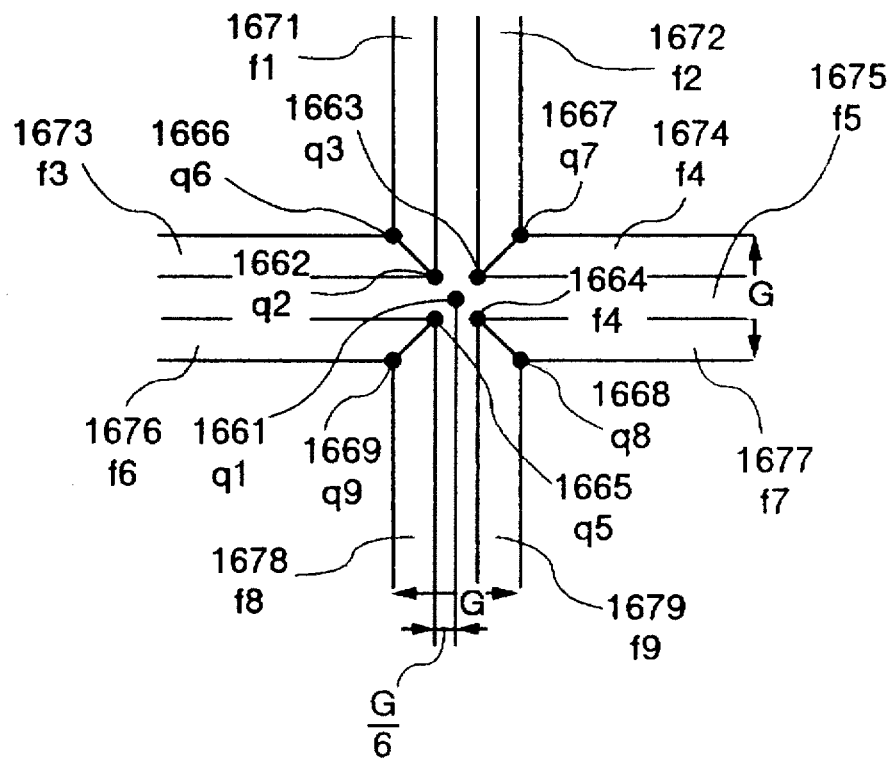

Then, a description will now be made of such a case that link data are intersected with each other in a cross form with reference to FIG. 17D. The point "q1" shows either a point (X1, Y1) of data link (1420), or a point (X2, Y2) thereof. The respective points of q2, q3, q4, q5, q6, q7, q8, q9 are obtained as follows. Here, a point P(q2) denotes horizontal/vertical coordinates [P(q2).v and P(q2).v] of the point P(q2). Also, symbol "G" indicates a width of a wiring pattern. It should be noted that distances between the points q1 and q2; the points q1 and q3; the points q1 and q5; and the points q1 and q4 along the horizontal/vertical directions are G/6, whereas distances between the points q1 and q6; the points q8; and the points q1 and q9 along the horizontal/vertical directions are G/2.

$$\left.\begin{array}{l} P(q2).h = P(q1).h - G/6, \\ P(q2).v = P(q1).v - G/6, \\ P(q3).h = P(q1).h + G/6, \\ P(q3).v = P(q1).v - G/6, \\ P(q4).h = P(q1).h + G/6, \\ P(q4).v = P(q1).v + G/6, \\ P(q5).h = P(q1).h - G/6, \\ P(q5).v = P(q1).v + G/6, \\ P(q6).h = P(q1).h - G/2, \\ P(q6).v = P(q1).v - G/2, \\ P(q7).h = P(q1).h + G/2, \\ P(q7).v = P(q1).v - G/2, \\ P(q8).h = P(q1).h + G/2, \\ P(q8).v = P(q1).v + G/2, \\ P(q9).h = P(q1).h - G/2, \\ P(q9).v = P(q1).v + G/2, \end{array}\right\} \quad (16)$$

Subsequently, the coordinates along the vertical direction are set to the displays of the point q2 to the point q9, normal vectors of the regions f1, f2, f3, f4, f5, f6, f7, f8, f9 are obtained, and the drawing colors are calculated in a similar manner to that of FIG. 5.

As previously explained, in accordance with this embodiment, when a plurality of figures are over-written on the display plane, the respective figures are three-dimensionally drawn, and the new figure is drawn on the previously drawn figure, and also the overlapped portion of the previously drawn figure is erased. As a consequence, these figures can be readily discriminated from each other. As to the wiring pattern of the integrated circuit, even when a total layer number of multilayer wiring patterns is large, these layers can be mutually and easily discriminated.

Although this embodiment has described such an example of drawing the multilayer wiring pattern by employing only the link data among the IC wiring pattern design data, a similar drawing process operation may be performed by employing the link data and the node data when the node is contained in the wiring pattern.

As previously described, in accordance with the present invention, since the thickness of the figures are increased in correspondence with the number of overlapped figures and the figures can be displayed with a contrast between light and shade from the light source direction, these figures can be represented with having thickness material feeling such as actual pictures by performing the same figure inputting work as the conventional figure inputting work.

What is claimed is:

1. A method for three-dimensionally displaying a two-dimensional figure on a display plane, the method comprising the steps of:
   a) designating a size and a drawing position of the two-dimensional figure to be drawn on said display plane by employing a pointing device equipped with at least one switch and connected to a computer;
   b) designating a height of a predetermined region of the figure to be drawn, measured from an edge portion of said figure to be drawn along a vertical direction with respect to said display plane by employing said pointing device;
   c) designating a direction of light illuminated to said figure to be drawn by employing said pointing device;
   d) calculating brightness of each of regions subdivided from said figure to be drawn based on both of said designated height and said light direction; and
   e) displaying each of said subdivided regions at said calculated brightness, whereby said figure is three-dimensionally represented.

2. A figure drawing method as claimed in claim 1 wherein:
   said step d) includes a substep for calculating a normal vector perpendicular to the respective planes of said subdivided regions; a substep for calculating an angle between said calculated normal vector and a vector of said light direction; and a substep for calculating brightness of said region based upon said calculated angle.

3. A figure drawing method as claimed in claim 1, further comprising the step of:
   f) designating a color of said figure to be drawn with employment of said pointing device, wherein said step e) is to display each of said subdivided regions with said designated color at said calculated brightness.

4. A figure drawing method as claimed in claim 1, further comprising the step of:
   drawing another figure by executing said preceding steps a) to e), whereby a portion of said previously drawn figure, which is overlapped with said another figure, is erased.

5. A figure drawing method as claimed in claim 1, further comprising the step of:
   drawing another figure by executing said preceding steps a) to e), whereby a height of a portion of said another figure, which is overlapped with said previously drawn figure, is equal to a summation between a height of said another figure and a height of said previously drawn figure.

6. A method for three-dimensionally displaying a figure on a display plane, the method comprising the steps of:
   a) designating a size and a drawing position of the figure to be drawn on said display plane with a pointing device having at least one switch and connected to a computer;
   b) designating a height of a predetermined region of the figure to be drawn, measured from an edge portion of said figure to be drawn along a vertical direction with respect to said display plane with said pointing device;
   c) designating a direction of light illuminated to said figure to be drawn with said pointing device;
   d) calculating brightness of each of regions subdivided from said figure to be drawn based on both of said designated height and said light direction, including:
      calculating three-dimensional coordinate values in each of said subdivided regions based on said drawing position, size and height, which are designated at steps a) and b),
      calculating a normal vector of said subdivided region based on said calculated three-dimensional coordinate values,
      calculating an angle between said calculated normal vector and a vector of said light direction, and calculating brightness of said region based upon said calculated angle; and e) displaying each of said subdivided regions at said calculated brightness, whereby said figure is three-dimensionally represented.

7. A figure drawing method as claimed in claim 6 wherein:

said substep for calculating the normal vector is to calculate three-dimensional coordinate values in each of said subdivided regions, assuming that all of said predetermined regions own said designated heights measured from said edge portion, and regions other than said predetermined regions of said figure to be drawn are inclined from said edge portion toward said predetermined regions.

8. A method for three-dimensionally displaying a two-dimensional figure on a display plane, comprising the steps of:

a) designating a size and a drawing position of the two-dimensional figure to be drawn on said display plane by employing a pointing device equipped with at least one switch and connected to a computer;

b) designating a height of a predetermined region of the figure to be drawn, measured from an edge portion of said figure to be drawn along a vertical direction with respect to said display plane by employing said pointing device;

c) designating a direction of light illuminated to said figure to be drawn by employing said pointing device;

d) calculating three-dimensional coordinate values of each of pixels of said figure to be drawn on said display plane and a vertical direction based upon said designated drawing position, size and height;

e) calculating brightness of each of said sub-divided regions of said figure to be drawn based upon said calculated coordinate values and said light direction; and f) displaying each of said subdivided regions at said calculated brightness, whereby said figure is three-dimensionally represented.

9. A figure drawing method as claimed in claim 8, further comprising the step of:

drawing another figure by executing said preceding steps a) to f), wherein:

in said step d) executed when said another figure is drawn, a coordinate value of a portion of said another figure, which is overlapped with said previously drawn figure, along a vertical direction with respect to said display plane, is equal to a summation between a coordinate value of said overlapped portion of said another figure along a vertical direction with respect to a display plane of said overlapped portion thereof, and a coordinate value of said overlapped portion of said previously drawn figure along a vertical direction with respect to a display plane of said overlapped portion thereof.

10. A method for three-dimensionally displaying a two-dimensional figure on a display plane the method comprising the steps of:

a) designating a size and a drawing position of the two-dimensional figure to be drawn on said display plane with a pointing device equipped with at least one switch and connected to a computer;

b) designating a height of a predetermined region of the figure to be drawn measured from an edge portion of said figure to be drawn along a vertical direction with respect to said display plane with said pointing device;

c) designating a direction of light illuminated to said figure to be drawn with said pointing device;

d) calculating three-dimensional coordinate values for each pixel of said figure to be drawn on said display plane and a vertical direction based upon said designated drawing position size and height;

e) calculation brightness of each of said sub-divided regions of said figure to be drawn based upon said calculated coordinate values and said light direction including:

1) calculating a normal vector perpendicular to the respective planes of said subdivided regions based on said calculated three-dimensional coordinate values;

2) calculating an angle between said calculated normal vector and a vector of said light direction; and 3) calculating brightness of said region based upon said calculated angle; and f) displaying each of said subdivided regions at said calculated brightness whereby said figure is three-dimensionally represented.

11. A figure drawing method as claimed in claim 10 wherein:

each of said subdivided regions is a polygon for connecting at least three pixels in said figure to be drawn.

12. A method for three-dimensional displaying a two-dimensional figure on a display plane, the method comprising the steps of:

a) designating a size and a drawing position of the two-dimensional figure to be drawn on said display plane by employing a pointing device equipped with at least one switch and connected to a computer;

b) designating a height of a predetermined region of the figure to be drawn, measured from an edge portion of said figure to be drawn along a vertical direction with respect to said display plane by employing said pointing device;

c) designating a direction of light illuminated to said figure to be drawn by employing said pointing device;

d) calculating two-dimensional coordinate values of pixels of said figure to be drawn on said display plane based on said designated drawing position and said designated size;

e) counting the coordinate values of said pixels of said figure to be drawn along the vertical direction with respect to said display plane based upon said designated height;

f) calculating brightness of each of said sub-divided regions of the figure to be drawn based on said coordinate values and said light direction calculated at said preceding steps d) and e); and g) displaying each of said subdivided regions at said calculated brightness, whereby said figure is three-dimensionally represented.

13. A figure drawing method as claimed in claim 12, further comprising the step of:

drawing another drawing by executing the preceding steps a) to g), wherein in said step e) executed when said another figure is drawn, counting values of the respective counters corresponding to a portion of said another figure, which is overlapped with said previously drawn figure, are equal to a summation between a counting value of said overlapped portion of said previously drawn figure, and a counting value of said overlapped portion of said another figure.

14. A method for three-dimensional displaying a two-dimensional figure on a display plane, the method comprising the steps of:
   a) designating a size and a drawing position of the two-dimensional figure to be drawn on said display plane by employing a pointing device equipped with at least one switch and connected to a computer;
   b) designating a height of a predetermined region of the figure to be drawn, measured from an edge portion of said figure to be drawn along a vertical direction with respect to said display plane by employing said pointing device;
   c) designating a direction of light illuminated to said figure to be drawn by employing said pointing device;
   d) calculating two-dimensional coordinate values of pixels of said figure to be drawn on said display plane based on said designated drawing position and said designated size;
   e) counting the coordinate values of said pixels of said figure to be drawn along the vertical direction with respect to said display plane based upon said designated height;
   f) calculating brightness of each of said sub-divided regions of the figure to be drawn based on said coordinate values and said light direction calculated at said preceding steps d) and e), including:
      calculating a normal vector perpendicular to the respective planes of said subdivided regions based on said calculated two-dimensional coordinate values,
      calculating an angle between said calculated normal vector and a vector of said light direction, and
      calculating brightness of said region based upon said calculated angle; and
   g) display each of said subdivided regions at said calculated brightness whereby said figure is three-dimensionally represented.

15. A figure drawing method as claimed in claim 14 wherein:
   each of said subdivided regions is a polygon in which at least three pixels in said figure to be drawn are used as vertexes.

16. A method for three-dimensionally displaying plural layers of a two-dimensional wiring pattern on a display plane, the method comprising the steps of:
   a) reading out wiring pattern data about plural layers of the wiring pattern from a memory unit connected to a computer, into which said wiring pattern data have been stored;
   b) deriving from said read wiring pattern data, link data with respect to each of links for constituting each layer of the wiring pattern among said plural layers, said link data being constructed of a starting point of said link, an end point thereof, two-dimensional coordinate values of said display plane, and the layer number; and
   c) displaying the respective layers of the wiring pattern based upon said read link data and displaying each link of one layer of said wiring pattern, including the substeps of:
      c-1) designating a height of a predetermined region of said link to be drawn, measured from an edge portion of said link to be drawn along a vertical direction with respect to said display plane by employing a pointing device equipped with at least one switch and connected to a computer;
      c-2) designating a direction of light illuminated to said link to be drawn by employing said pointing device;
      c-3) calculating brightness of each of regions subdivided from said link to be drawn; and
      c-4) displaying each of said subdivided regions at said calculated brightness, whereby said link is three-dimensionally represented.

17. A figure drawing method as claimed in claim 16 wherein:
   said substep c-3 includes a substep for calculating a normal vector perpendicular to the respective planes of said subdivided regions; a substep for calculating an angle between said calculated normal vector and a vector of said light direction; and a substep for calculating brightness of said region based upon said calculated angle.

18. A figure drawing method as claimed in claim 17, further comprising the substep of:
   c-5) designating a color of said figure to be drawn with employment of said pointing device, wherein said substep c-4) is to display each of said subdivided regions with said designated color at said calculated brightness.

19. A figure drawing method as claimed in claim 16 wherein:
   after a wiring pattern of the lowermost layer has been drawn at said step c), another wiring pattern of a layer positioned above said lowermost layer is drawn by said step c), whereby a portion of said wiring pattern of said lowermost layer, which is overlapped with the wiring pattern of the layer located above said lowermost layer, is erased.

20. A figure drawing method as claimed in claim 16 wherein:
   said step b) is to further derive from said read wiring pattern data with respect to each of nodes arranged on said links for constituting said wiring pattern of each layer from said plural layers, node data constructed of two-dimensional coordinate values on said display plane and the number of said layer; and
   said step c) is to display the nodes on the wiring patterns of the respective layers based on said derived node data.

21. A method for three-dimensionally displaying plural layers of a wiring pattern on a display plane, the method comprising the steps of:
   a) reading out wiring pattern data about plural layers of the wiring pattern from a memory unit connected to a computer, in which said wiring pattern data have been stored;
   b) deriving from said read wiring pattern data link data with respect to each of links for constituting each layer of the wiring pattern among said plural layers, said link data being constructed of a starting point of said link, an end point thereof two-dimensional coordinate values of said display plane, and the layer number; and
   c) displaying the respective layers of the wiring pattern based upon said read link data including displaying each link of one layer of said wiring pattern including;
      c-1) designating a height of a predetermined region of said link to be drawn, measured from an edge portion of said link to be drawn along a vertical direction with respect to said displaying plane using pointing device equipped with at least one switch and connected to the computer;
      c-2) designating a direction of light illuminated to said link to be drawn by employing said pointing device;
      c-3) calculating brightness of each of regions sub-divided from said link to be drawn including the steps of:

calculating three-dimensional coordinate values in each of said subdivided regions based upon said two dimensional coordinate values read out at said step b) and said height designated at said step c-1), calculating a normal vector of said subdivided region based on said calculated three-dimensional coordinate values, calculating an angle between said calculated normal vector and a vector of said light direction, and calculating brightness of said region based upon said calculated angle; and c-4) displaying each of said subdivided regions at said calculated brightness, whereby said link is three-dimensionally represented.

22. A figure drawing method as claimed in claim 21 wherein:

said substep for calculating the normal vector is to calculate three-dimensional coordinate values in each of said subdivided regions, assuming that all of said predetermined regions own said designated heights measured from said edge portion, and regions other than said predetermined regions of said figure to be drawn are inclined from said edge portion toward said predetermined regions.

* * * * *

UNITED STATES PATENT AND TRADEMARK OFFICE
CERTIFICATE OF CORRECTION

PATENT NO. : 5,673,375
DATED : September 30, 1997
INVENTOR(S) : Youichi Horii

It is certified that error appears in the above-identified patent and that said Letters Patent is hereby corrected as shown below:

Claim 10, column 22, line 7, delete "calculation" and insert therefor --calculating--.

claim 14, column 23, line 34, delete "display" and insert therefor -- displaying--;

claim 21, column 24, line 49, after first occurance of "data" insert --,--;

claim 21, column 24, line 53, after "thereof" insert --,-- claim 21, column 24, line 61, after "using" insert --a--.

Signed and Sealed this

Thirtieth Day of March, 1999

Q. TODD DICKINSON

*Attest:*

*Attesting Officer*    Acting Commissioner of Patents and Trademarks